United States Patent
Tokuchi

(10) Patent No.: US 10,359,975 B2
(45) Date of Patent: Jul. 23, 2019

(54) INFORMATION PROCESSING DEVICE AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/978,206

(22) Filed: May 14, 2018

(65) Prior Publication Data

US 2019/0056893 A1    Feb. 21, 2019

(30) Foreign Application Priority Data

Aug. 15, 2017  (JP) .................. 2017-156937

(51) Int. Cl.
  *G06F 3/12*    (2006.01)
  *B41J 3/46*    (2006.01)
  *G03G 15/00*    (2006.01)

(52) U.S. Cl.
  CPC ............. *G06F 3/1226* (2013.01); *B41J 3/46* (2013.01); *G03G 15/5087* (2013.01); *G06F 3/1204* (2013.01); *G06F 3/1232* (2013.01)

(58) Field of Classification Search
  CPC .... G06F 3/1226; G06F 3/1232; G06F 3/1204; G03G 14/5087; B41J 3/46

USPC ........................................................ 358/1.13
See application file for complete search history.

(56) References Cited

U.S. PATENT DOCUMENTS

| | | | |
|---|---|---|---|
| 2012/0140284 A1 | 6/2012 | Tashiro et al. | |
| 2013/0057900 A1 | 3/2013 | Ohta | |
| 2014/0063542 A1* | 3/2014 | Aoki | G06F 3/1296 358/1.15 |
| 2014/0357366 A1* | 12/2014 | Koganezawa | G06T 19/006 463/31 |

FOREIGN PATENT DOCUMENTS

| | | |
|---|---|---|
| JP | 2014-048672 | 3/2014 |
| JP | 5737906 | 6/2015 |
| JP | 2015-177504 | 10/2015 |
| JP | 2015-223006 | 12/2015 |

* cited by examiner

*Primary Examiner* — Saeid Ebrahimi Dehkordy
(74) *Attorney, Agent, or Firm* — JCIPRNET

(57) ABSTRACT

An information processing device includes a controller that, when a user operates a device image associated with a device and a function image associated with a function, controls display of a linkage function executable using the device and the function. In a further modification of the invention, the device image may be a captured image generated by capturing the device.

20 Claims, 24 Drawing Sheets

<DEVICE FUNCTION MANAGEMENT TABLE>

| DEVICE ID | DEVICE NAME (TYPE) | FUNCTION | IMAGE ID |
|---|---|---|---|
| A | PC | DISPLAY FUNCTION, SAVING FUNCTION, ··· | ··· |
| B | MULTIFUNCTION DEVICE | PRINT FUNCTION, SCAN FUNCTION, COPY FUNCTION, FACSIMILE FUNCTION, POST-PROCESSING FUNCTION, ··· | ··· |
| C | PROJECTOR | PROJECTION FUNCTION, ··· | ··· |
| ··· | ··· | ··· | ··· |

FIG.7

<LINKAGE FUNCTION MANAGEMENT TABLE>

| COMBINATION OF DEVICE IDS | DEVICE NAME (TYPE) | LINKAGE FUNCTION |
|---|---|---|
| A, B | PC (A), MULTIFUNCTION DEVICE (B) | SCAN TRANSFER FUNCTION |
| | | PRINT FUNCTION |
| A, C | PC (A), PROJECTOR (C) | PROJECTION FUNCTION |
| | | PRINT FUNCTION |
| B, C | MULTIFUNCTION DEVICE (B), PROJECTOR (C) | PROJECTION FUNCTION |
| | | PRINT FUNCTION |
| ... | ... | ... |

FIG.14

<LINKAGE FUNCTION MANAGEMENT TABLE>

| COMBINATION OF FUNCTION IDS | FUNCTION NAME (TYPE) | LINKAGE FUNCTION |
|---|---|---|
| α, β | DATA TRANSMITTING (α), | ... |
|  | PASSWORD SETTING (β) | ... |
| α, γ | DATA TRANSMITTING (α), | ... |
|  | SOUND OUTPUTTING (γ) | ... |
| β, γ | PASSWORD SETTING (β), | ... |
|  | SOUND OUTPUTTING (γ) | ... |
| ... | ... | ... |

<LINKAGE FUNCTION MANAGEMENT TABLE>

| COMBINATION OF IDS | DEVICE NAME, FUNC-TION NAME (TYPE) | LINKAGE FUNCTION |
|---|---|---|
| A, α | PC (A), DATA TRANSMITTING (α) | ... ... |
| A, β | PC (A), PASSWORD SETTING (β) | ... ... |
| B, α | MULTIFUNCTION DEVICE (B), DATA TRANSMITTING (α) | ... ... |
| ... | ... | ... |

FIG.26

<LINKAGE FUNCTION MANAGEMENT TABLE>

| COMBINATION OF DEVICE IDS | DEVICE NAME (TYPE) | LINKAGE FUNCTION | CONNECTION ORDER | PRIORITY |
|---|---|---|---|---|
| A, B | PC (A), MULTIFUNCTION DEVICE (B) | SCAN TRANSFER FUNCTION | B→A | 1 |
| | | | A→B | 2 |
| | | PRINT FUNCTION | A→B | 1 |
| | | | B→A | 2 |
| A, C | PC (A), PROJECTOR (C) | PROJECTION FUNCTION | A→C | 1 |
| | | | C→A | 2 |
| | | ... | C→A | 1 |
| | | | A→C | 2 |
| ... | | | | ... |

*FIG.29*

<DEVICE FUNCTION MANAGEMENT TABLE>

| DEVICE ID | DEVICE NAME (TYPE) | POSITION IN IMAGE | FUNCTION | IMAGE ID |
|---|---|---|---|---|
| A | PC | ... | SCREEN DISPLAY FUNCTION | ... |
| | | ... | DATA SAVING FUNCTION | |
| | | ... | ... | |
| B | MULTI-FUNCTION DEVICE | ... | PRINT FUNCTION | ... |
| | | ... | SCAN FUNCTION | |
| | | ... | STAPLING FUNCTION | |
| | | ... | ... | |
| ... | ... | ... | ... | ... |

*FIG.32*

<DEVICE FUNCTION MANAGEMENT TABLE>

| DEVICE ID | DEVICE NAME (TYPE) | PORTION | PORTION ID | FUNCTION | PORTION IMAGE ID |
|---|---|---|---|---|---|
| A | PC | DISPLAY UNIT | Aa | SCREEN DISPLAY FUNCTION | ... |
| | | MAIN BODY PORTION | Ab | DATA SAVING FUNCTION | ... |
| | | ... | ... | ... | ... |
| B | MULTIFUNC- TION DEVICE | MAIN BODY PORTION | Ba | PRINT FUNCTION | ... |
| | | READING UNIT | Bb | SCAN FUNCTION | ... |
| | | POST-PROCESS -ING DEVICE | Bc | STAPLING FUNCTION | ... |
| | | ... | ... | ... | ... |
| C | PROJECTOR | MAIN BODY PORTION | Ca | PROJECTION FUNCTION | ... |
| | | ... | ... | ... | ... |
| ... | ... | ... | ... | ... | ... |

FIG.33

<LINKAGE FUNCTION MANAGEMENT TABLE>

| COMBINATION OF PORTIONS OF DEVICES | COMBINATION OF PORTION IDS | LINKAGE FUNCTION |
|---|---|---|
| DISPLAY UNIT OF PC (A), MAIN BODY PORTION OF MULTIFUNCTION DEVICE (B) | Aa, Ba | PRINT FUNCTION |
|  | ... | ... |
| MAIN BODY PORTION OF MULTIFUNCTION DEVICE (B), MAIN BODY PORTION OF PROJECTOR(C) | Ba, Ca | PRINT FUNCTION |
|  | ... | ... |
| READING UNIT OF MULTI-FUNCTION DEVICE (B), MAIN BODY PORTION OF PROJECTOR (C) | Bb, Ca | SCAN PROJECTION FUNCTION |
|  | ... | ... |

FIG.34

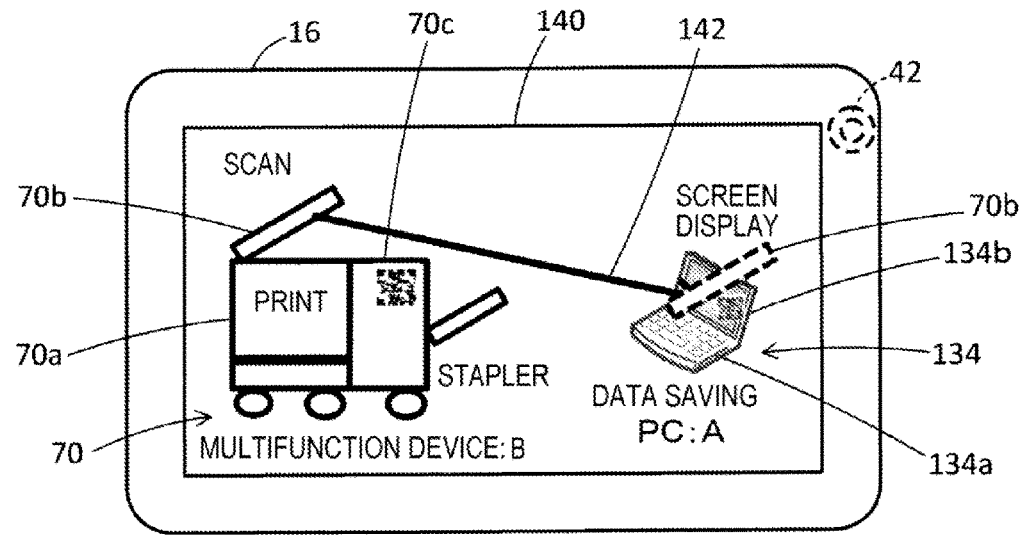

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-156937 filed Aug. 15, 2017.

BACKGROUND

Technical Field

The present invention relates to an information processing device and a non-transitory computer readable medium.

SUMMARY

According to an aspect of the invention, an information processing device includes a controller that, when a user operates a device image associated with a device and a function image associated with a function, controls display of a linkage function executable using the device and the function.

BRIEF DESCRIPTION OF THE DRAWINGS

Exemplary embodiments of the present invention will be described in detail based on the following figures, wherein:

FIG. 7 is a diagram illustrating an example of a linkage function management table;

FIG. 14 is a diagram illustrating an example of a linkage function management table according to a second exemplary embodiment;

FIG. 26 is a diagram illustrating an example of a linkage function management table;

FIG. 29 is a diagram illustrating an example of a device function management table;

FIG. 32 is a diagram illustrating an example of a device function management table;

FIG. 33 is a diagram illustrating an example of a linkage function management table;

FIG. 34 is a diagram illustrating an example of a screen; and

DETAILED DESCRIPTION

<First Exemplary Embodiment>

Figure 1:
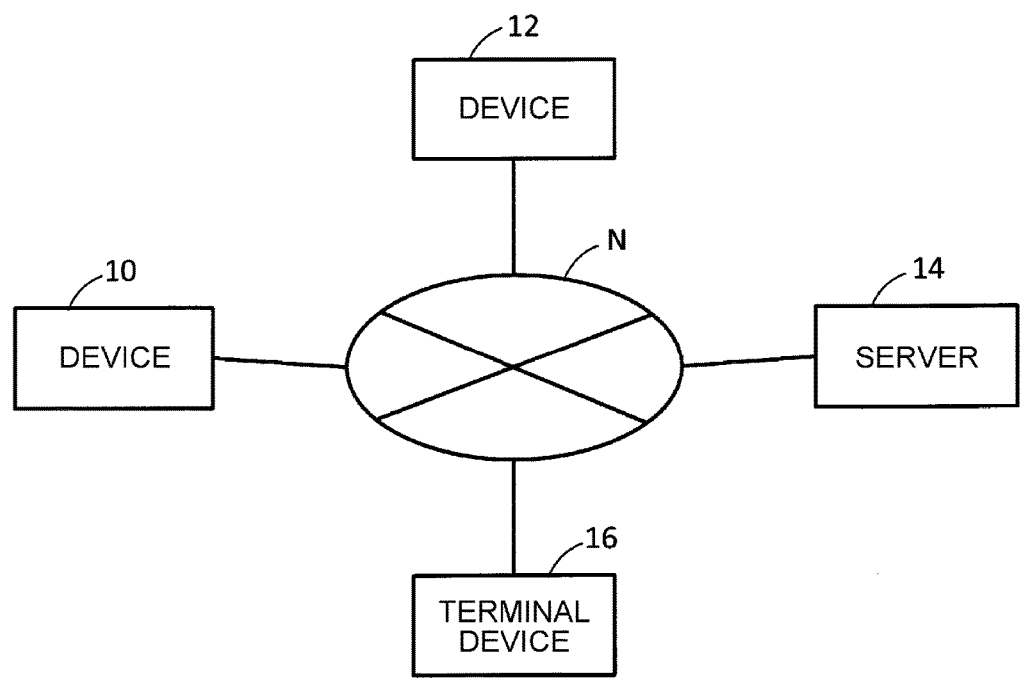
FIG. 1 is a block diagram illustrating a device system according to a first exemplary embodiment of the present invention.

A device system as an information processing system according to a first exemplary embodiment of the present invention will be described with reference to FIG. 1. FIG. 1 illustrates an example of the device system according to the first exemplary embodiment.

The device system according to the first exemplary embodiment includes plural devices (for example, devices 10 and 12), a server 14 as an example of an external device, and a terminal device 16 as an example of an information processing device. In the example illustrated in FIG. 1, the devices 10, 12, the server 14, and the terminal device 16 have a function of communicating with each other via a communication path N such as a network. Of course, the devices 10, 12, the server 14, and the terminal device 16 may communicate with other devices via different communication paths without using the communication path N. In the example illustrated in FIG. 1, two devices (devices 10 and 12) are provided in the device system. However, one device may be provided in the device system, or three or more devices may be provided in the device system. Further, plural servers 14 and plural terminal devices 16 may be included in the device system.

The devices 10 and 12 are devices having a specific function, and examples thereof include an image forming device having an image forming function, a personal computer (PC), a projector, a display device such as a liquid crystal display and a projector, a telephone, a clock, a surveillance camera, and the like. In addition, the devices 10 and 12 have a function of transmitting and receiving data to and from other devices. In the present exemplary embodiment, it is assumed that the device 10 is an image forming device as an example. The image forming device (device 10) is, for example, a device having at least one function among a scan function, a print function, a copy function, and a facsimile function.

The server 14 is a device that manages the functions that each device has. For example, the server 14 manages functions that each device has, linkage functions for using plural functions, and the like. In addition, the server 14 has a function of transmitting and receiving data to and from other devices.

For each user, the server 14 may manage functions usable by the user. Functions usable by a user include, for example, a function provided to the user for free, a function provided to the user for a charge and purchased by the user, and the like. For each user, the server 14 may manage usable function information (for example, function purchase history information) indicating functions usable by the user. Of course, there are also functions that are usable for free, additional update functions, and functions that are specifically managed by an administrator. Therefore, the server 14 does not have to equally manage the functions depending on whether the functions are purchased. The process of purchasing the functions is performed, for example, by the server 14. Of course, the purchase process may be performed by another device.

The terminal device 16 is a device such as a personal computer (PC), a tablet PC, a smartphone, a mobile phone, or the like, and has a function of transmitting and receiving data to and from other devices. For example, the terminal device 16 functions as a user interface unit (UI unit) when using the device.

Hereinafter, each device included in the device system according to the first exemplary embodiment will be described in detail.

Figure 2:
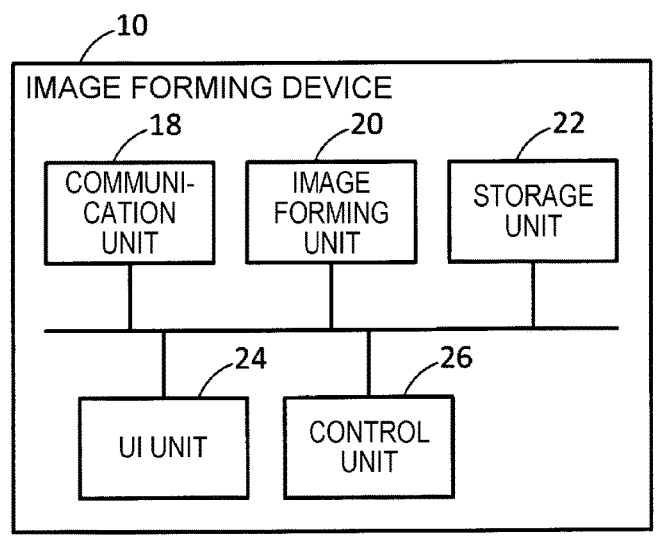
FIG. 2 is a block diagram illustrating an image forming device according to the first exemplary embodiment.

The configuration of the device 10 serving as an image forming device will be described in detail with reference to FIG. 2. Hereinafter, the device 10 may be referred to as the image forming device 10. FIG. 2 illustrates the configuration of the image forming device 10.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one or plural types of communication methods and may communicate with a communication partner according to a communication method suitable for the communication partner (that is, a communication method that the communication partner is compatible with). The communication method is, for example, infrared communication, visible light communication, Wi-Fi (registered trademark) communication, near-field wireless communication (for example, near field communication (NFC), etc.), and the like. Examples of the near-field wireless communication include Felica (registered trademark), Bluetooth (registered trademark), RFID (Radio Frequency Identifier), and the like. Of course, other types of wireless communication may be used for the near-field wireless communication. For example, the communication unit 18 may switch the communication method or the frequency band depending on the communication partner, or switch the communication method or the frequency band depending on the surrounding environment.

An image forming unit 20 has an image forming function. Specifically, the image forming unit 20 has at least one function among a scan function, a print function, a copy function, or a facsimile function. As the scan function is executed, a document is read so that scan data (image data) is generated. As the print function is executed, the image is printed on a recording medium such as paper. As the copying function is executed, the document is read and printed on the recording medium. As the facsimile function is executed, the image data is transmitted or received by facsimile. In addition, a linkage function using plural functions may be executed. For example, a scan transfer function that is a combination of a scan function and a transmission function (transfer function) may be executed. When the scan transfer function is executed, a document is read to generate scan data (image data), and the scan data is transmitted to a transmission destination (for example, an external device such as the terminal device 16). Of course, this linkage function is merely an example, and another linkage function may be executed.

A storage unit 22 is a storage device such as a hard disk or memory (for example, SSD etc.). The storage unit 22 stores, for example, information indicating an instruction of image formation (for example, job information), image data to be printed, scan data generated by executing the scan function, and device address information indicating addresses of other devices, server address information indicating an address of the server 14, various control data, various programs, and the like. Of course, these may be stored in separate storage devices or may be stored in one storage device.

A UI unit 24 is a user interface unit and includes a display unit and an operation unit. The display unit is, for example, a display device such as a liquid crystal display. The operation unit is an input device such as a touch panel or a keyboard. Of course, it may be a user interface that serves as a display unit and an operation unit (for example, a touch-type display, a device for electronically displaying a keyboard or the like on a display, etc.). The image forming device 10 may not be provided with the UI unit 24, or may have a hardware user interface unit (hardware UI unit) as hardware instead of having the display unit. The hardware UI unit is, for example, a hardware key (for example, a numeric keypad) specialized for numeric input, a hardware key (for example, direction instruction key) specialized for direction instruction, and the like.

A control unit 26 controls the operation of each unit of the image forming device 10.

Figure 3:
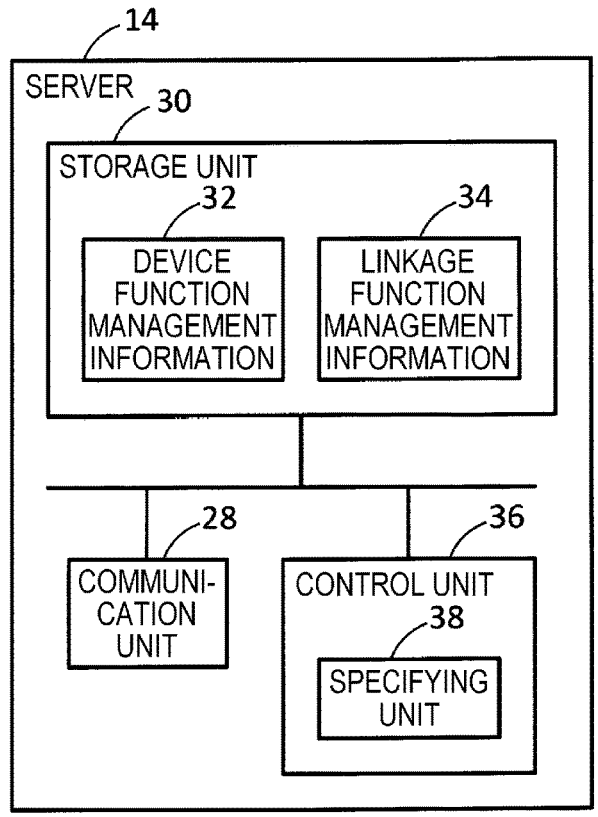
FIG. 3 is a block diagram illustrating a server according to the first exemplary embodiment.

Hereinafter, the configuration of the server 14 will be described in detail with reference to FIG. 3. FIG. 3 illustrates the configuration of the server 14.

A communication unit 28 is a communication interface and has a function of transmitting data to another device and a function of receiving data from another device. The communication unit 28 may be a communication interface having a wireless communication function or a communication interface having a wired communication function.

A storage unit 30 is a storage device such as a hard disk or memory (for example, SSD etc.). The storage unit 30 stores, for example, a device function management information 32, a linkage function management information 34, various data, various programs, device address information indicating the address of each device, server address information indicating the address of the server 14, and the like. Of course, these may be stored in separate storage devices or may be stored in one storage device. The device function management information 32 and the linkage function management information 34 stored in the storage unit 30 may be provided to the terminal device 16 regularly or at a designated timing, and therefore, the information stored in the terminal device 16 may be updated. Hereinafter, the device function management information 32 and the linkage function management information 34 will be described.

The device function management information 32 is information for managing the functions that respective devices have, and includes, for example, information indicating association between device identification information for identifying a device (device identification information) and function information indicating the function that the device has. The device identification information includes, for example, a device ID, a device name, information indicating the type of the device, the model number of the device, information for managing the device (for example, asset management number, etc.), information indicating the location where the device is installed (position information of the device), a device image associated with the device, address information of the device, and the like. The device image is, for example, an external appearance image representing the device. The external appearance image may be an image representing the outside of the device (for example, the casing of the device), an image representing a state where the casing is opened such that the inside thereof is seen from the outside (for example, the internal structure), or an image representing a state where the device is covered with a packaging sheet or the like. The device image may be an image generated by capturing the device (such as an image representing the outside of the device or an image representing the inside), or an image imitating the device (for example, an icon). The function information includes, for example, a function ID, a function name, or the like. For example, when the image forming device 10 has a scan function, a print function, a copy function, and a scan transfer function, the device identification information of the image forming device 10 is associated with function information indicating the scan function, function information indicating the print function, function information indicating the copy function, and function information indicating the scan transfer function. The functions that each device has are specified (identified) by referring to the device function management information 32.

The device managed by the device function management information 32 is, for example, a device (for example, the device 10 or 12) included in the device system. Of course, devices not included in the device system may be managed by the device function management information 32. For example, the server 14 may acquire information on a new device not included in the device system (information including device identification information and function information) and newly register the information in the device function management information 32. The information on the device may be acquired, for example, using the Internet or the like, or may be input by an administrator or the like. Further, the server 14 may update the device function management information 32 at any timing, regularly, or at a timing designated by an administrator or the like. Thus, function information indicating a function that the device does not have before updating but the device has after updating may be registered in the device function management information 32. Similarly, function information indicating a function that the device has before updating but the device does not have after updating may be deleted from or registered as unusable information in the device function management information 32. The information for updating may be acquired, for example, using the Internet or the like, or may be input by an administrator or the like.

The linkage function management information 34 is information for managing a linkage function executed by linking plural functions to each other. One or plural linkage functions are executed by linking plural functions to each other. For example, the linkage function may be executed by linking plural functions that a single device (for example, the device 10 or 12) has to each other, or by linking plural functions that plural devices (for example, the device 10 or 12) have to each other. Further, the terminal device (the terminal device 16 in the present exemplary embodiment) issuing the operation instruction may also be included in the device to be identified, and the function that the terminal device has may be used as a part of the linkage function.

The linkage function may be a function executed without using a device as hardware. For example, the linkage function may be a function executed by linking plural pieces of software to each other. Of course, the linkage function may be a function executed by linking a function that the device has as hardware and a function implemented by software to each other.

The linkage function management information 34 is information indicating, for example, association between a combination of function information indicating respective functions used in the linkage function and linkage function information indicating the linkage functions. The linkage function information includes, for example, a linkage function ID, a linkage function name, or the like. When a solo function is updated, the linkage function management information 34 is also updated along with the update. As a result, the linkage function by plural functions that have been unable to be linked to each other before updating may be made usable after updating, and on the contrary to this, the linkage function that has been usable before updating may be made unusable after updating. The linkage function information indicating the linkage function that is made usable after updating is registered in the linkage function management information 34, and the linkage function information indicating the linkage function that is made unusable after updating is deleted from or registered as unusable information in the linkage function management information 34.

In the case of linking plural devices to each other, the linkage function management information 34 is information for managing a linkage function that uses plural functions that plural devices have, and is information indicating association between the combination of the device identification information for identifying each device used for the linkage function and the linkage function information. As described above, when the device function management information 32 is updated, the linkage function management information 34 is also updated along with the update. As a result, the linkage function by plural devices that are unable to be linked to each other before updating may be made usable after updating. On the contrary, the linkage function that has been usable before updating may be made unusable after updating.

The linkage function may a function that is executed by linking plural functions, which are different from each other, to each other, or a function that is executed by linking the same functions to each other. The linkage function may be a function that has been unusable before the linkage. The function that has been unusable before the linkage may be a function that is usable using the same function among the functions that a device to be linked has or a function that is usable by combining different functions. For example, when a device having a print function (printer) and a device having a scan function (scanner) are linked to each other, a copy function is implemented as a linkage function. That is, the copy function is implemented by linking the print function and the scan function to each other. In this case, the copy function as a linkage function and a combination of the print function and the scan function are associated with each other. In the linkage function management information 34, for example, linkage function information indicating the copy function as a linkage function is associated with a combination of device identification information for identifying a device having a print function and device identification information for identifying a device having a scan function.

The concept of the linkage function may include a coalescing function that enables a new function to be executed by linking plural functions or plural devices to each other. For example, an extended display function as a coalescing function may be implemented by combining plural displays. As another example, a recording function as a coalescing function may be implemented by combining a television and a recorder. The recording function may be a function of recording an image displayed on the television. In addition, an image capturing area extension function as a coalescing function may be implemented by combining plural cameras. The extension function is, for example, a function of capturing in a manner of connecting the capturing areas of the respective cameras. In addition, a translated call function (a function of translating a conversation via a telephone) as a coalescing function may be implemented by combining a telephone with a translator or translation software. As described above, the concept of the linkage function includes a function that may be implemented by linking the same types of devices or functions to each other and a function that may be implemented by linking different types of devices or functions to each other.

The storage unit 30 may store usable function management information. The usable function management information is information for managing the functions usable by respective users, and is, for example, information indicating association between user identification information for identifying a user and function information indicating the function usable by the user (which may include linkage function information). As described above, the function usable by the user is, for example, a function provided to the user free of charge, a function purchased by the user, and the like, which may be a single function or a linkage function. The user identification information is, for example, user account information such as user ID and name. The functions usable by each user are specified (identified) by referring to the usable function management information. The usable function management information is updated, for example, each time when a function is provided to the user (for example, each time when a function is provided to the user for free or for a charge).

A control unit 36 controls the operation of each unit of the server 14. Further, the control unit 36 includes a specifying unit 38.

The specifying unit 38 receives device identification information for identifying a device and specifies function information indicating a function associated with the device identification information in the device function management information 32 stored in the storage unit 30. Therefore, the function that the device has is specified (identified). For example, the device identification information is transmitted from the terminal device 16 to the server 14, and the specifying unit 38 specifies function information indicating a function associated with the device identification information. Information on the function (for example, function information, function explanation information, etc.) is transmitted, for example, from the server 14 to the terminal device 16 and displayed on the terminal device 16. As a result, the information on the function that the device specified by the device identification information has is displayed on the terminal device 16.

Further, the specifying unit 38 receives the device identification information for identifying each device to be linked and specifies the linkage function information indicating the linkage function associated with a combination of respective device identification information in the linkage function management information 34 stored in the storage unit 30. Therefore, the linkage function executed by linking the functions that the respective devices to be linked have is specified (identified). For example, plural pieces of device identification information are transmitted from the terminal device 16 to the server 14, and the specifying unit 38 specifies linkage function information indicating a linkage function associated with the plural pieces of device identification information. Information on the linkage function (for example, linkage function information, linkage function explanation information, etc.) is transmitted, for example, from the server 14 to the terminal device 16 and displayed on the terminal device 16. As a result, the information on the linkage function executed by the plural devices specified by the plural pieces of device identification information is displayed on the terminal device 16.

For example, when one device is identified (for example, when one device is captured), the specifying unit 38 may receive device identification information for identifying the device and specify function information indicating a function associated with the device identification information in the device function management information 32. Therefore, when one device is identified (for example, when one device is captured), the function that the device has is specified (identified). When plural devices are identified (for example, when plural devices are captured), the specifying unit 38 may receive device identification information for identifying each device included in the plural devices and specify linkage function information indicating a linkage function associated with a combination of respective device identification information in the linkage function management information 34. Therefore, when plural devices are identified (for example, when plural devices are captured), the linkage function using the functions that the plural devices have is specified (identified).

Further, the specifying unit 38 may receive function information indicating each function used for the linkage function and specify the linkage function information indicating the linkage function associated with a combination of respective function information in the linkage function management information 34 stored in the storage unit 30. Therefore, the linkage function executed by linking the respective functions to be linked is specified (identified). For example, plural pieces of function information are transmitted from the terminal device 16 to the server 14, and the specifying unit 38 specifies linkage function information indicating a linkage function associated with the plural pieces of function information. Similarly to the above, the information on the linkage function executed by the plural devices specified by the plural pieces of function information is displayed on the terminal device 16.

When the functions usable by a user are managed, the specifying unit 38 may receive user identification information for identifying the user and specify function information indicating each function associated with the user identification information in the usable function management information stored in the storage unit 30. As a result, a group of functions usable by the user is specified (identified). For example, the user identification information is transmitted from the terminal device 16 to the server 14, and the specifying unit 38 specifies function information indicating each function associated with the user identification information. Information on each function usable by the user (for example, information indicating the name of each function) is transmitted, for example, from the server 14 to the terminal device 16 and displayed on the terminal device 16. As a result, the information on each function usable by the user specified by the user identification information is displayed on the terminal device 16. For example, the specifying unit 38 receives the device identification information and the user identification information, specifies function information indicating a function associated with the device identification information in the device function management information 32, and also specifies function information indicating a function associated with the user identification information in the usable function management information. As a result, the function that the device specified by the device identification information has and is usable by the user identified by the user identification information.

The control unit 36 may execute a function purchase process and manage the history of the purchase. For example, when a paid function is purchased by a user, the control unit 36 may apply a charging process to the user.

Further, the control unit 36 may execute functions related to image processing such as, for example, a character recognition function, a translation function, an image processing function, and an image forming function. Of course, the control unit 36 may execute functions related to any process other than the image processing. As the character recognition function is executed, characters in the image are recognized and character data indicating the characters is generated. As the translation function is executed, the characters in the image are translated into characters represented in a specific language, and character data indicating the translated characters is generated. As the image processing function is executed, the image is processed. The control unit 36 may receive, for example, scan data generated by executing the scan function from the image forming device 10 and execute functions related to the image processing such as the character recognition function, the translation function, the image processing function, and the like, on the scan data. The control unit 36 may receive image data from the terminal device 16 and execute the respective functions on the image data. The character data and image data generated by the control unit 36 are transmitted, for example, from the server 14 to the terminal device 16. The server 14 is used as an external device, and the linkage function may be a function of using functions that plural devices including the server 14 have.

Figure 4:
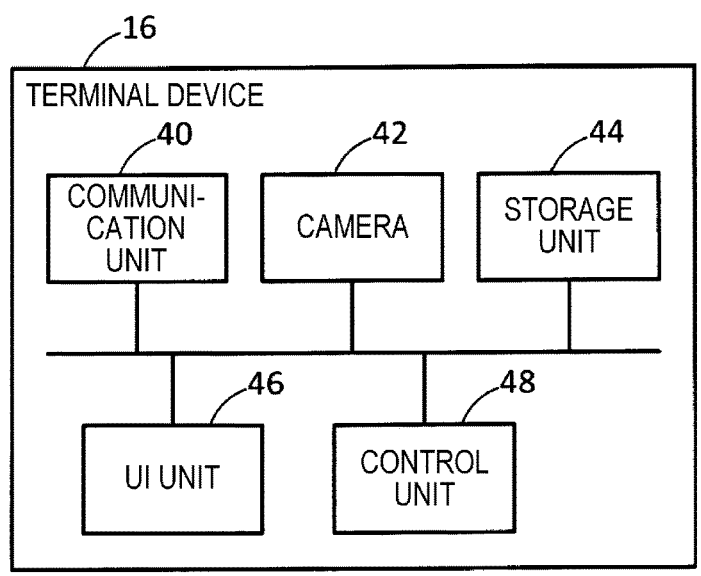
FIG. 4 is a block diagram illustrating a terminal device according to the first exemplary embodiment.

Hereinafter, the configuration of the terminal device 16 will be described in detail with reference to FIG. 4. FIG. 4 illustrates the configuration of the terminal device 16.

A communication unit 40 is a communication interface and has a function of transmitting data to another device and a function of receiving data from another device. The communication unit 40 may be a communication interface having a wireless communication function or a communication interface having a wired communication function. For example, the communication unit 40 corresponds to one or plural types of communication methods and may communicate with a communication partner according to a communication method suitable for the communication partner (that is, a communication method supported by the communication partner). The communication method is, for example, infrared communication, visible light communication, Wi-Fi communication, near-field wireless communication, and the like. For example, the communication unit 40 may switch the communication method or the frequency band depending on the communication partner, or switch the communication method or the frequency band depending on the surrounding environment.

A camera 42 as an image capturing unit generates image data (for example, still image data or moving image data) by capturing an object to be captured. Further, in addition to using the camera of the terminal device 16, image data captured by an external camera connected to a communication path such as a network may be received by the communication unit 40, and the image data may be displayed by a UI unit 46, so that the user may operate the image data.

A storage unit 44 is a storage device such as a hard disk or a memory (for example, SSD), and stores various programs, various data, address information of the server 14, address information of each device (for example, address information of the devices 10 and 12), information on the identified device, information on the identified device to be linked, information on the function that the identified device has, information on the linkage function, and the like.

The UI unit 46 is a user interface unit and includes a display unit and an operation unit. The display unit is, for example, a display device such as a liquid crystal display. The operation unit is an input device such as, for example, a touch panel, a keyboard, a mouse or the like. Of course, it may be a user interface that serves as a display unit and an operation unit (for example, a touch-type display, a device for electronically displaying a keyboard or the like on a display, etc.).

A control unit 48 controls the operation of each unit of the terminal device 16. The control unit 48 functions as, for example, a display controller (controller) and displays various information on the display unit of the UI unit 46.

The display unit of the UI unit 46 displays thereon, for example, an image captured by the camera 42, an image associated with a device identified as a device to be used (for example, a device used alone or a device to be linked), an image associated with a function, and the like. The image associated with the device may be an image (still image or moving image) representing the device captured by the camera 42, or may be an image schematically representing the device (for example, an icon). For example, the schematically indicated image data may be stored in the server 14 and provided from the server 14 to the terminal device 16, may be stored in advance in the terminal device 16, or may be stored in another device and provided from the other device to the terminal device 16. The image associated with the function is, for example, an image such as an icon representing the function.

The above-described device function management information 32 may be stored in the storage unit 44 of the terminal device 16. In this case, the device function management information 32 may not be stored in the storage unit 30 of the server 14. Similarly, the above-described linkage function management information 34 may be stored in the storage unit 44 of the terminal device 16. In this case, the linkage function management information 34 may not be stored in the storage unit 30 of the server 14. The control unit 48 of the terminal device 16 may have the specifying unit 38 described above, and may identify the device based on the device identification information so as to specify the function that the device has or specify a linkage function that uses plural functions. In this case, the server 14 may not have the specifying unit 38.

When usable function management information is created, the usable function management information may be stored in the storage unit 44 of the terminal device 16. In this case, the usable function management information may not be stored in the storage unit 30 of the server 14. The control unit 48 of the terminal device 16 may manage history of the purchase of functions by a user. In this case, the control unit 36 of the server 14 may not have the management function thereof. The control unit 48 of the terminal device 16 may specify functions usable by the user based on the user identification information.

As still another example, the device function management information 32 and the linkage function management information 34 may be stored in the devices such as the devices 10 and 12, or the devices such as the devices 10 and 12 may have the specifying unit 38. That is, a process by the specifying unit 38 of the server 14 (for example, a device identification process, a function identification process, a linkage function identification process, etc.) may be performed in the server 14, may be performed in the terminal device 16, or may be performed in the devices such as the devices 10 and 12.

In the present exemplary embodiment, as an example, by applying an augmented reality (AR) technology, the device identification information is acquired so that the device is identified. For example, by applying the AR technology, the device identification information of the device used alone is acquired, so that the device is identified, and the device identification information of the device to be linked is acquired, so that the device to be linked is identified. As the AR technology, any known AR technology is used. Examples thereof include a marker AR technique using a marker such as a two-dimensional barcode, a markerless AR technique using an image recognition technology, a position information AR technique using position information, and the like. Of course, the device identification information may be acquired without using the AR technology, and then the device may be identified. For example, when the device is connected to the network, the device may be identified based on the IP address, or the device ID may be read to identify the device. In addition, in a case of a device or a terminal device having various wireless communication functions such as infrared communication, visible light communication, Wi-Fi, Bluetooth, etc., the device may be identified by acquiring the device IDs of devices linked using these wireless communication functions, and the linkage function may be executed.

Figures 5, 6:
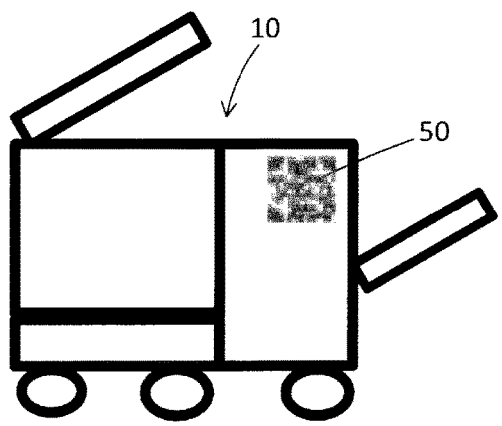
FIG. 5 is a schematic diagram illustrating an external appearance of the image forming device.
FIG. 6 is a diagram illustrating an example of a device function management table.

Hereinafter, the process of acquiring the device identification information will be described in detail with reference to FIG. 5. As an example, a case of acquiring the device identification information of the image forming device 10 will be described. FIG. 5 schematically illustrates the external appearance of the image forming device 10. Here, descriptions will be made on a process for acquiring device identification information by applying the marker AR technique. A marker 50 such as a two-dimensional barcode or the like is provided on the casing of the image forming device 10. The marker 50 is information in which the device identification information of the image forming device 10 is encoded. A user activates the camera 42 of the terminal device 16 and captures the marker 50 provided in the image forming device 10 to be used with the camera 42. As a result, image data representing the marker 50 is generated. The image data is transmitted, for example, from the terminal device 16 to the server 14. In the server 14, the control unit 36 extracts the device identification information by applying a decoding process to the marker image represented in the image data. As a result, the image forming device 10 to be used (the image forming device 10 having the captured marker 50) is identified. The specifying unit 38 of the server 14 specifies the function information indicating the function associated with the extracted device identification information in the device function management information 32. Therefore, the function that the image forming device 10 to be used has is specified (identified).

The control unit 48 of the terminal device 16 may extract the device identification information by applying the decoding process to the image data representing the marker 50. In this case, the extracted device identification information is transmitted from the terminal device 16 to the server 14. The specifying unit 38 of the server 14 specifies the function information indicating the function associated with the device identification information transmitted from the terminal device 16 in the device function management information 32. When the device function management information 32 is stored in the storage unit 44 of the terminal device 16, the control unit 48 of the terminal device 16 may specify the function information indicating the function associated with the extracted device identification information in the device function management information 32.

Function information indicating the functions that the image forming device 10 has may be encoded and included in the marker 50. In this case, when the decoding process is applied to the image data representing the marker 50, the device identification information of the image forming device 10 is extracted, and the function information indicating the function that the image forming device 10 has is extracted as well. As a result, the image forming device 10 is specified (identified), and functions that the image forming device 10 has are specified (identified). The decoding process may be performed by the server 14 or may be performed by the terminal device 16.

In a case of executing a linkage function using functions that plural devices have, device identification information of each device is acquired by capturing a marker of each device to be linked, so that the linkage function is specified (identified).

In a case of acquiring the device identification information by applying the markerless AR technique, for example, the user captures the entirety or a part of the external appearance of the device to be used (for example, the image forming device 10) by the camera 42 of the terminal device 16. Of course, it is useful to acquire information for specifying a device such as a name (for example, product name) of a device to be used, a model number, or an asset management number, by capturing the external appearance. External appearance image data representing the entirety or a part of the external appearance of the device to be used is generated by image capturing. The external appearance image data is transmitted, for example, from the terminal device 16 to the server 14. In the server 14, the control unit 36 identifies the device to be used based on the external appearance image data. For example, the storage unit 30 of the server 14 stores, for each device, external appearance image association information indicating the association between the external appearance image data representing the entirety or a part of the external appearance of the device and the device identification information of the device. For example, the control unit 36 compares the external appearance image data transmitted from the terminal device 16 with each external appearance image data included in the external appearance image association information, and specifies the device identification information of the device to be used based on the comparison result. For example, the control unit 36 extracts features of the external appearance of the device to be used from the external appearance image data transmitted from the terminal device 16, specifies the external appearance image data representing features identical or similar to the features of the external appearance in the external appearance image data group included in the external appearance image association information, and specifies the device identification information associated with the external appearance image data. As a result, the device to be used (the device captured by the camera 42) is identified. As another example, when the name (for example, product name) or model number of the device is captured and external appearance image data representing the name or model number is generated, the device to be used may be identified based on the name or model number indicated in the external appearance image data. The specifying unit 38 of the server 14 specifies the function information indicating the functions associated with the specified device identification information in the device function management information 32. Therefore, the functions that the device to be used (for example, the image forming device 10) has are specified.

The control unit 48 of the terminal device 16 may compare the external appearance image data representing the entirety or a part of the external appearance of the device to be used (for example, the image forming device 10) with each external appearance image data included in the external appearance image association information, and specify the device identification information of the device to be used based on the comparison result. The external appearance image association information may be stored in the storage unit 44 of the terminal device 16. In this case, the control unit 48 of the terminal device 16 specifies the device identification information of the device to be used by referring to the external appearance image association information stored in the storage unit 44 of the terminal device 16. As another example, the control unit 48 of the terminal device 16 may acquire external appearance image association information from the server 14 and specify the device identification information of the device to be used by referring to the external appearance image association information.

In a case of executing a linkage function using plural functions that plural devices have, device identification information of each device to be linked is acquired by capturing the entirety or a part of the external appearance of each device to be linked, so that the linkage function is specified (identified).

When acquiring the device identification information by applying the position information AR technique, position information indicating the position where the device (for example, the image forming device 10) is installed is acquired using, for example, the global positioning system (GPS) function. For example, each device has the GPS function and acquires device position information indicating the position of the device itself. The terminal device 16 outputs information indicating a device position information acquisition request to the device to be used, and receives device position information of the device from the device as a response to the acquisition request. The device position information is transmitted, for example, from the terminal device 16 to the server 14. In the server 14, the control unit 36 identifies the device to be used based on the device position information. For example, the storage unit 30 of the server 14 stores, for each device, position association information indicating the association between the device position information indicating the position where the device is installed and the device identification information of the device. The control unit 36 specifies the device identification information associated with the device position information transmitted from the terminal device 16 in the position association information. Therefore, the device to be used is specified (identified). The specifying unit 38 of the server 14 specifies the function information indicating the functions associated with the specified device identification information in the device function management information 32. Therefore, the function that the device to be used (for example, the image forming device 10) has is specified (identified).

The control unit 48 of the terminal device 16 may specify the device identification information associated with the position information of the device to be used in the position association information. The position association information may be stored in the storage unit 44 of the terminal device 16. In this case, the control unit 48 of the terminal device 16 specifies the device identification information of the device to be used by referring to the position association information stored in the storage unit 44 of the terminal device 16. As another example, the control unit 48 of the terminal device 16 may acquire position association information from the server 14 and specify the device identification information of the device to be used by referring to the position association information.

In a case of executing a linkage function using plural devices, device position information of each device to be linked is acquired, and device identification information of each device is specified based on the device position information of each device. Therefore, the linkage function is specified (identified).

Plural identification techniques may be used to identify devices. For example, a device may be identified using plural techniques selected from the marker AR technique, the markerless AR technique, and the position information AR technique. Further, when a device cannot be identified by a certain identification technique, the device may be identified using another identification technology. For example, when a device is not able to be identified by the marker AR technique or the markerless AR technique, the device may be identified using the position information AR technique.

Hereinafter, the image forming system according to the first exemplary embodiment will be described in more detail.

The device function management information 32 will be described in detail with reference to FIG. 6. FIG. 6 illustrates an exemplary device function management table as the device function management information 32. In the device function management table, as an example, the device ID, the information indicating the device name (for example, the type of the device), the information indicating the function that the device has (function information), and the image ID are associated with each other. The device ID and the device name corresponds to an example of the device identification information. The image ID is an example of image identification information for identifying a device image associated with the device. The device function management table may not be included in the image ID. For example, a device of which the device ID is "B" is a multifunction device (an image forming device having plural image forming functions), and has functions such as a print function and a scan function. The device is associated with an image ID for identifying a device image associated with the device. The data of the device image associated with the device is stored in, for example, the storage unit 30 of the server 14 or another device.

For example, the device ID for identifying the device to be used is acquired by applying the AR technology. The specifying unit 38 of the server 14 specifies the device name, the function, and the image ID associated with the device ID by referring to the device function management table. Therefore, the device to be used is identified. For example, information indicating a device name and data of a device image associated with the device are transmitted from the server 14 to the terminal device 16, and these are displayed on the UI unit 46 of the terminal device 16. Of course, the image itself captured by the camera 42 may be displayed on the UI unit 46 of the terminal device 16. Further, when a device image associated with the device (for example, an image captured by the camera 42 or an image schematically representing the device) is designated by the user in the UI unit 46 of the terminal device 16, information on the function that the device (for example, function information, function explanation information, etc.) has may be transmitted from the server 14 to the terminal device 16 and displayed on the UI unit 46 of the terminal device 16.

Hereinafter, the linkage function management information 34 will be described in detail with reference to FIG. 7. FIG. 7 illustrates an exemplary linkage function management table as the linkage function management information 34. In the linkage function management table, as an example, a combination of the device IDs, the information indicating the names of the devices to be linked (for example, the types of the devices), and the information indicating the linkage functions (linkage function information) are associated with each other. For example, the device of which the device ID is "A" is a PC (personal computer), and the device of which the device ID is "B" is a multifunction device. When the PC (A) and the multifunction device (B) are linked to each other, for example, "scan transfer function" and "print function" are implemented as linkage functions. The "scan transfer function" is a function of transferring image data generated by scanning by the multifunction device (B) to the PC (A). The "print function" is a function of transmitting data (for example, image data and document data) saved in the PC (A) to the multifunction device (B) and printing it with the multifunction device (B).

Figure 8:
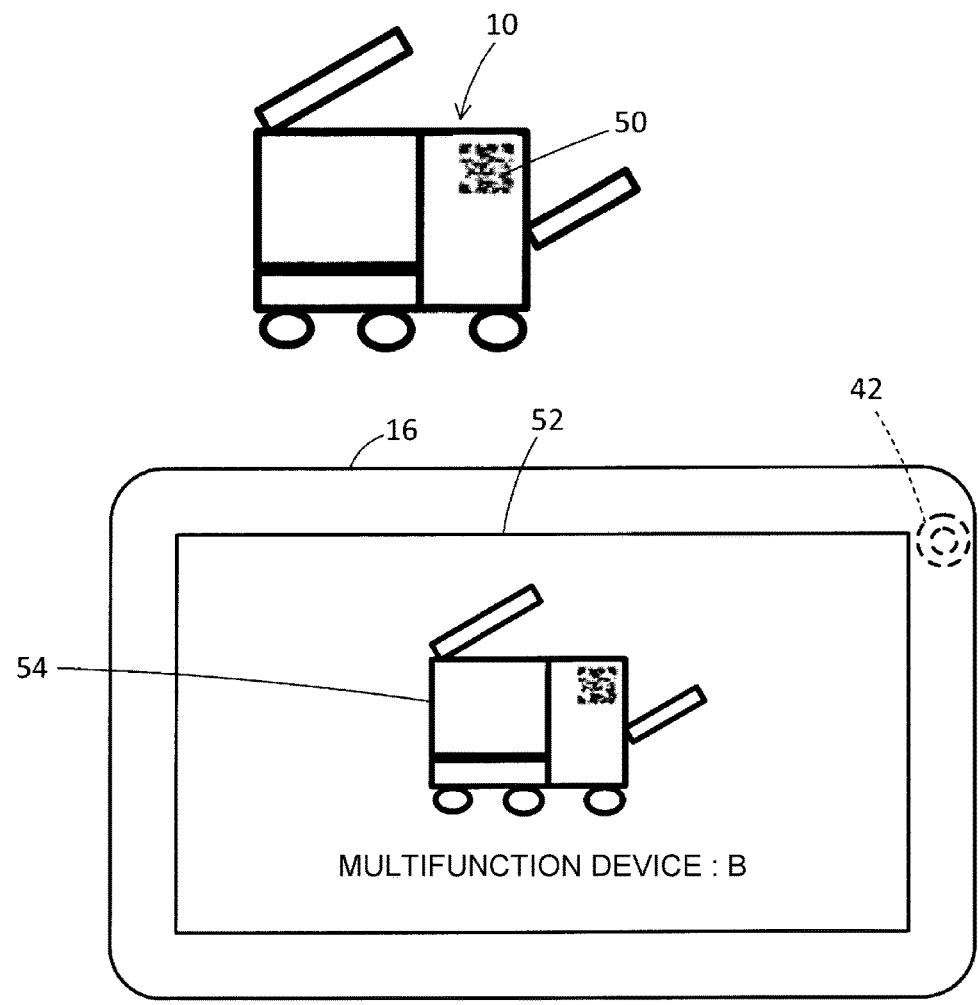
FIG. 8 is a diagram illustrating a device used alone.

Hereinafter, a process in the case of using a device alone will be described with reference to FIG. 8. FIG. 8 illustrates an example of a device used alone. As an example, it is assumed that the image forming device 10 is a device used alone. The image forming device 10 is, for example, a multifunction device. The image forming device 10 is a device existing in a real space. The terminal device 16 illustrated in FIG. 8 is a device existing in the real space, and is, for example, a portable terminal device such as a smartphone or a mobile phone.

For example, a marker 50 such as a two-dimensional barcode or the like is provided on the casing of the image forming device 10. When the marker AR technique or the markerless AR technique is used, the user captures the image forming device 10 to be used by the camera 42 of the terminal device 16 (for example, a smartphone). As a result, image data representing the marker 50 or external appearance image data representing the external appearance of the image forming device 10 is generated. A device display screen 52 is displayed on the display unit of the UI unit 46 of the terminal device 16, and a device image 54 associated with the image forming device 10 is displayed on the device display screen 52. The device image 54 is, for example, an image generated by capturing by the camera 42 (it may be an image having a size at the time of capturing or may be an enlarged or reduced image).

The image data generated by capturing by the camera 42 is transmitted from the terminal device 16 to the server 14. In the server 14, the control unit 36 applies the decoding process to the image data to extract the device identification information of the image forming device 10, thereby identifying the image forming device 10. As another example, external appearance image data representing the external appearance of the image forming device 10 may be generated, and the external appearance image data may be transmitted from the terminal device 16 to the server 14. In this case, the control unit 36 of the server 14 specifies the device identification information of the image forming device 10 by referring to the external appearance image association information. Therefore, the image forming device 10 is identified.

Further, the specifying unit 38 of the server 14 specifies (identifies) the function that the image forming device 10 has by referring to the device function management information 32 (for example, the device function management table illustrated in FIG. 6). In this regard, detailed descriptions will be made with reference to FIG. 6. As an example, it is assumed that the image forming device 10 is a "multifunction device (B)." The specifying unit 38 specifies the functions associated with the multifunction device (B) in the device function management table illustrated in FIG. 6. Therefore, the functions that the multifunction device (B) has are specified. Information on the specified functions is transmitted from the server 14 to the terminal device 16. Of course, the process for identifying devices and functions may be performed by the terminal device 16.

Instead of the image generated by capturing by the camera 42, an image prepared in advance and associated with the identified image forming device 10 (not an image itself obtained by image-capturing but a schematic image (for example, an icon)) or an image generated by capturing by an external camera may be displayed as the device image 54 on the device display screen 52.

For example, in the case of using image data obtained by capturing a device, the external appearance of the current device itself (for example, an external appearance to which scratches, a memo, a seal affixed to the device, etc. are reflected) is reflected in the image, so that the user may see the difference visually from other similar devices.

When a schematic image is used, data of the schematic image is transmitted, for example, from the server 14 to the terminal device 16. For example, when the image forming device 10 is identified, the specifying unit 38 of the server 14 specifies the schematic image associated with the image forming device 10 by referring to the device function management table (the device function management information 32) illustrated in FIG. 6. The data of the schematic image is transmitted from the server 14 to the terminal device 16, and the schematic image thereof is displayed on the device display screen 52 as the device image 54. The data of the schematic image may be stored in advance in the terminal device 16. In this case, when the image forming device 10 is identified, the device image 54 stored in the terminal device 16 is displayed on the device display screen 52. The data of the schematic image may be stored in a device other than the server 14 and the terminal device 16.

Further, when the device is identified, information indicating the name of the device may be transmitted from the server 14 to the terminal device 16, and the name of the device may be displayed on the device display screen 52 in the terminal device 16. In the example illustrated in FIG. 8, the image forming device 10 is a multifunction device, and its name "multifunction device (B)" is displayed.

Figure 9:
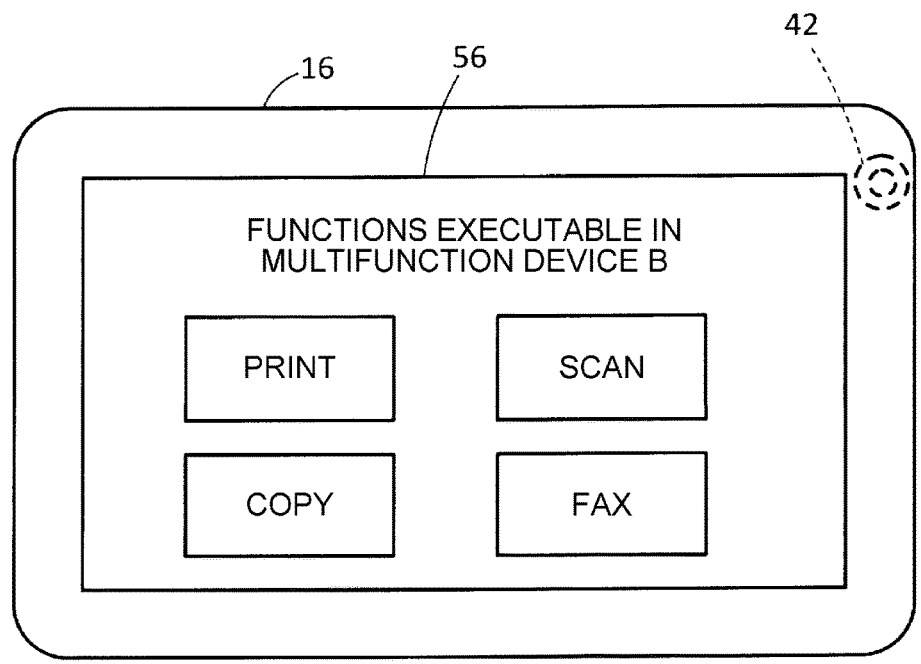
FIG. 9 is a diagram illustrating an example of a function display screen.

When the function that the image forming device 10 has is specified, for example, as illustrated in FIG. 9, the control unit 48 of the terminal device 16 displays a function display screen 56 on the UI unit 46 of the terminal device 16 and displays information on the functions in the function display screen 56. For example, a button image for instructing execution of a function is displayed as information on the functions. Since the multifunction device (B) as the image forming device 10 has, for example, a print function, a scan function, a copy function, and a facsimile function, a button image for instructing the execution of these functions is displayed on the function display screen 56. For example, when the user designates a button image representing the print function using the terminal device 16 and instructs execution of the print function, execution instruction information indicating the execution instruction of the print function is transmitted from the terminal device 16 to the image forming device 10. The execution instruction information includes data such as control data for executing the print function, image data to which the print function is applied, and the like. When receiving the execution instruction information, the image forming device 10 executes printing in accordance with the execution instruction information.

Figure 10:
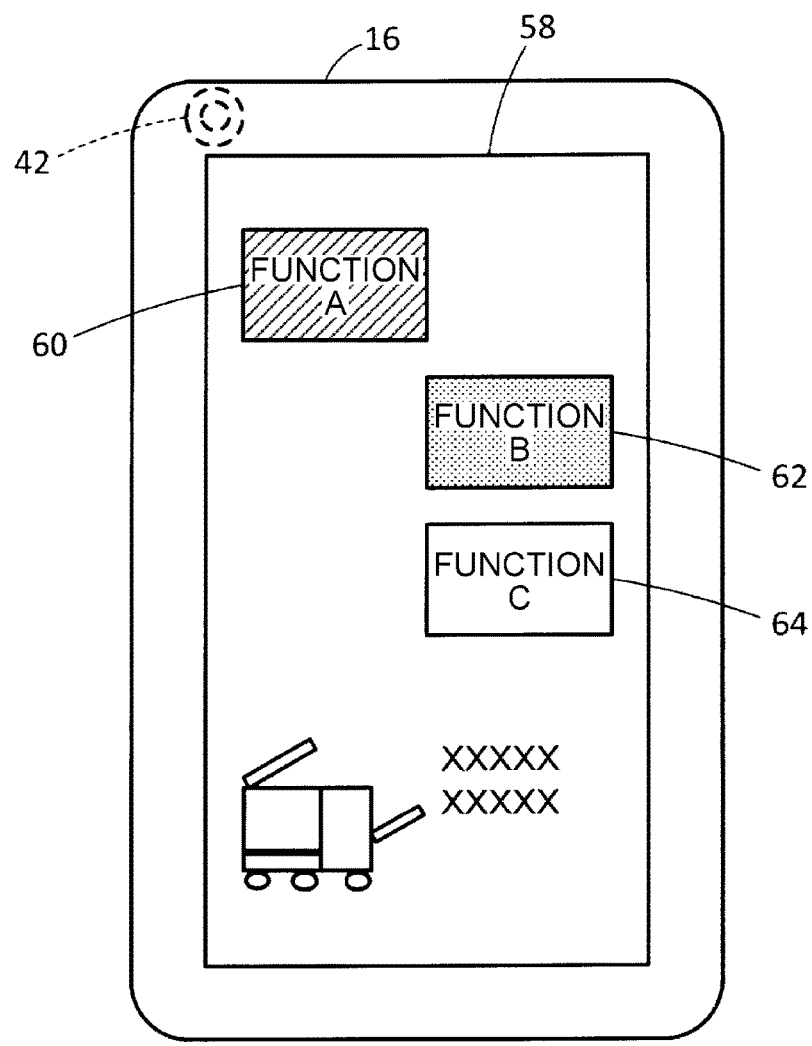
FIG. 10 is a diagram illustrating an example of a function display screen.

FIG. 10 illustrates another example of the function display screen. As illustrated in FIG. 8, the function display screen 58 is a screen displayed on the UI unit 46 of the terminal device 16 when using a single device. As described above, the device to be used (for example, the image forming device 10) is specified, and the functions that the device to be used has are specified. In addition, the function information indicating the functions associated with the user identification information by the user using the device to be used, that is, the functions usable by the user may be specified. Further, since the functions of the device to be used are specified, a function that the device to be used does not have among the group of functions to be provided may be specified. These pieces of information may be displayed on the function display screen 58.

As an example of the function information, a button image 60 representing a function A, a button image 62 representing a function B, and a button image 64 representing a function C are displayed on the function display screen 58 illustrated in FIG. 10. The function A is a function that the device to be used (for example, the identified image forming device 10) has and is a function that is usable by the user. The function B is a function that the device to be used has and is a function that is unusable by the user. When the user is provided with the function B, the use of the function B by the user is enabled. When the function B is a paid function, the use of the function B is enabled when the user purchases the function B by the user, and when the function B is a free function, the use of the function B is enabled by receiving the function B free of charge. The function C is a function that the device to be used does not have, that is, a function that the device to be used is not compatible with. The control unit 48 of the terminal device 16 may change a manner in which the button image is displayed, depending on whether or not the function represented by the button image is a function that the device to be used has. Further, the control unit 48 may change the manner in which the button image is displayed, depending on whether or not the function represented by the button image is a function usable by the user. For example, the control unit 48 may change the color or shape of the button image. In the example illustrated in FIG. 10, the button images 60, 62, and 64 are displayed in different colors. As an example, a button image which is a function that the device to be used has and represents a function usable by the user (for example, the button image 60 representing the function A) is displayed in blue. A button image which is a function that the device to be used has and represents a function unusable by the user (for example, the button image 62 representing the function B) is displayed in yellow. A button image which is a function that the device to be used (for example, the button image 64 representing the function C) does not have is displayed in gray. As another example, the control unit 48 may change the shape of the button images 60, 62, and 64, or may change the font of the function display name. Of course, the display manner may be changed by another method. Therefore, the availability of each function is communicated to the user with good visibility.

For example, when a user designates the button image 60 representing the function A using the terminal device 16 and gives an instruction to execute the function A, the execution instruction information indicating the execution instruction of the function A is transmitted from the terminal device 16 to the device to be used. The execution instruction information includes data such as control data for executing the function A, image data to which the process by the function A is applied, and the like. When receiving the execution instruction information, the device to be used executes the function A in accordance with the execution instruction information. For example, when the device to be used is the image forming device 10 and the function A is the scan transfer function, the scan function is executed by the image forming unit 20 of the image forming device 10, and accordingly scan data (image data) is generated. The scan data is transmitted to a transmission destination (for example, the terminal device 16) set from the image forming device 10.

Further, when the user designates the button image 62 representing the function B using the terminal device 16 and instructs the provision of the function B, the providing process is executed. When the providing process is performed by the server 14, the terminal device 16 accesses the server 14. Accordingly, a screen for receiving the provision of the function B (for example, a website) is displayed on the UI unit 46 of the terminal device 16 as information for enabling the use of the function B by the user. When the provision procedure is performed on this screen, the use of the function B by the user is enabled. For example, a program of a web browser is stored in the terminal device 16, and access from the terminal device 16 to the server 14 is implemented using the web browser. When the user accesses the server 14 using the web browser, a function providing screen (for example, a website) is displayed on the UI unit 46 of the terminal device 16, and the function is provided through the website. Of course, the providing process may be performed by a server or the like other than the server 14. As another example, in the UI unit 46 of the terminal device 16, a use permission request screen (for example, a website) for requesting use permission of the function B to the administrator or the like may be displayed as information for enabling use of the function B by the user. The use permission request of the function B is issued to the administrator or the like via the use permission request screen, and when the permission is obtained, the use of the function B by the user is enabled.

Figure 11:
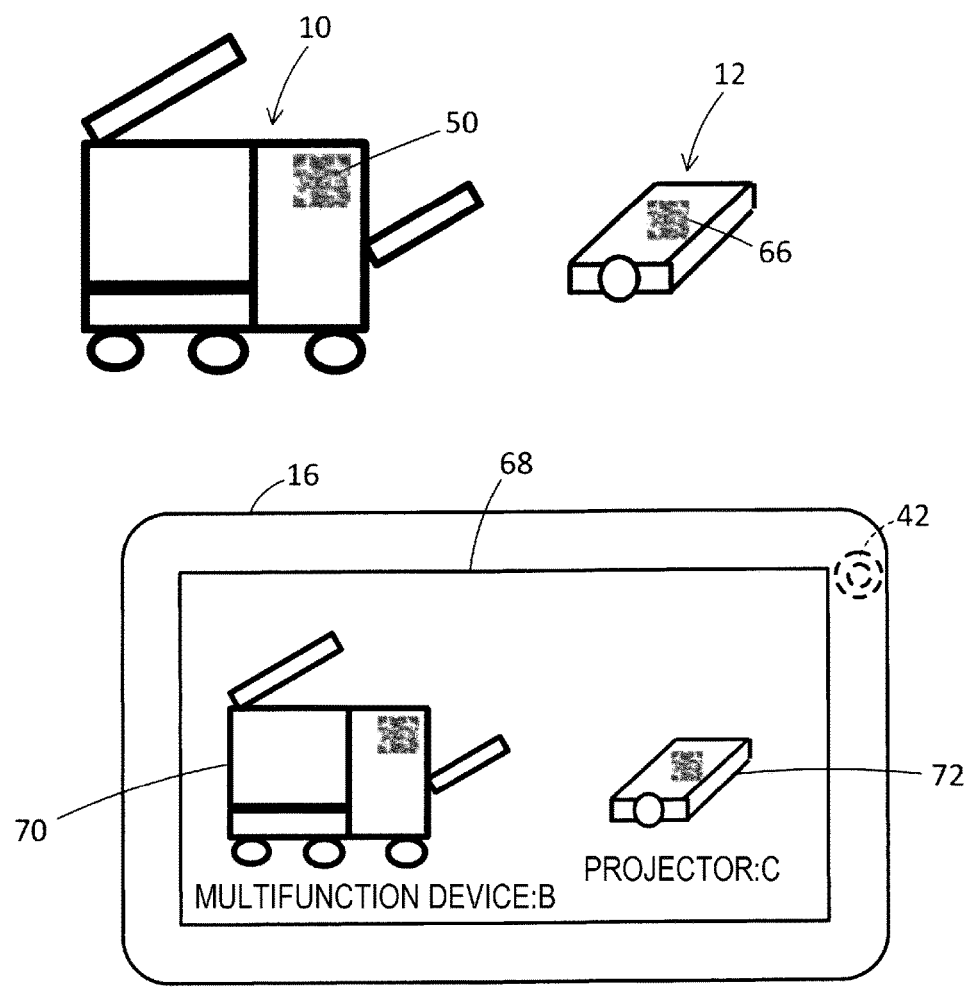
FIG. 11 is a diagram illustrating devices to be linked.

Hereinafter, a process in the case of using a linkage function will be described with reference to FIG. 11. FIG. 11 illustrates an example of devices to be linked. As an example, it is assumed that the image forming device 10 and a projector as the device 12 (hereinafter, referred to as a projector 12 in some cases) are used as devices to be linked. The image forming device 10, the projector 12, and the terminal device 16 are devices existing in a real space.

For example, a marker 50 such as a two-dimensional barcode is provided on the casing of the image forming device 10, and a marker 66 such as a two-dimensional barcode is provided on the casing of the projector 12. The marker 66 is information in which the device identification information of the projector 12 is encoded. When the marker AR technique or the markerless AR technique is used, the user captures the image forming device 10 and the projector 12 to be linked by the camera 42 of the terminal device 16 (for example, a smartphone). In the example illustrated in FIG. 11, the image forming device 10 and the projector 12 are captured together in a state where both the image forming device 10 and the projector 12 are included in the capturing area of the camera 42. As a result, image data representing each of the markers 50 and 66 is generated. A device display screen 68 is displayed on the display unit of the UI unit 46 of the terminal device 16, and a device image 70 associated with the image forming device 10 and a device image 72 associated with the projector 12 are displayed on the device display screen 68. The device images 70 and 72 are, for example, images generated by capturing by the camera 42 (they may be images having a size at the time of capturing or may be enlarged or reduced images).

The image data generated by capturing by the camera 42 is transmitted from the terminal device 16 to the server 14. In the server 14, the control unit 36 applies the decoding process to the image data to extract the device identification information of the image forming device 10 and the device identification information of the projector 12, thereby identifying the image forming device 10 and the projector 12. As another example, external appearance image data representing the external appearance of each of the image forming device 10 and the projector 12 may be generated and transmitted from the terminal device 16 to the server 14. In this case, the control unit 36 of the server 14 specifies the device identification information of the image forming device 10 and the device identification information of the projector 12 by referring to the external appearance image association information. Therefore, the image forming device 10 and the projector 12 are identified.

Further, the specifying unit 38 of the server 14 specifies (identifies) the linkage function using the function that the image forming device 10 has and the function that the projector 12 has by referring to the linkage function management information 34 (for example, the linkage function management table illustrated in FIG. 7). In this regard, detailed descriptions will be made with reference to FIG. 7. As an example, it is assumed that the image forming device 10 is a "multifunction device (B)," and the projector 12 is a "projector (C)." The specifying unit 38 specifies the linkage functions associated with the combination of the multifunction device (B) and the projector (C) in the linkage function management table illustrated in FIG. 7. Therefore, the linkage function executed by linking the multifunction device (B) and the projector (C) is specified. Information on the specified linkage functions is transmitted from the server 14 to the terminal device 16. Of course, the process for identifying devices and linkage functions may be performed by the terminal device 16.

Instead of the image generated by capturing by the camera 42, an image prepared in advance and associated with the identified image forming device 10 (for example, a schematic image (for example, an icon)) or an image generated by capturing by an external camera may be displayed as the device image 70 on the device display screen 68. Similarly, an image prepared in advance and associated with the identified projector 12 or an image generated by capturing by an external camera may be displayed as the device image 72. As described above, for example, the schematic image data may be transmitted from the server 14 to the terminal device 16, may be stored in advance in the terminal device 16, or may be stored in any device other than the devices.

Further, when the device is identified, information indicating the name of the device may be transmitted from the server 14 to the terminal device 16, and the name of the device may be displayed on the device display screen 68 in the terminal device 16. In the example illustrated in FIG. 11, the name "multifunction device (B)" of the image forming device 10 and the name "projector (C)" of the projector 12 are displayed.

Even when plural devices are captured, the specifying unit 38 of the server 14 may specify the functions that each device has by referring to the device function management information 32. In the example illustrated in FIG. 11, the specifying unit 38 may specify each of the functions that the image forming device 10 has and the functions that the projector 12 has. Information on the specified functions may be transmitted from the server 14 to the terminal device 16.

Figure 12:
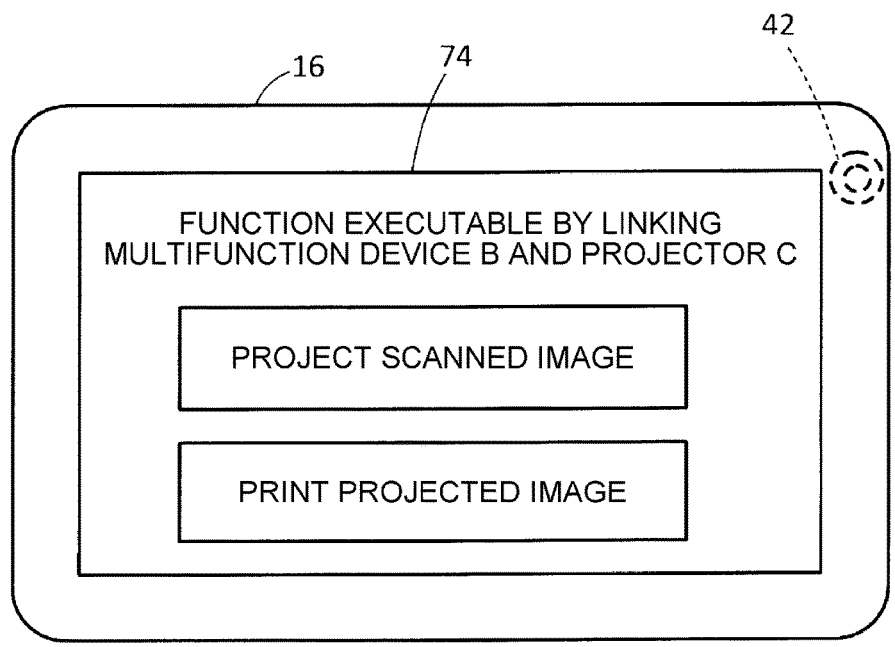
FIG. 12 is a diagram illustrating an example of a function display screen.

When linkage functions are specified, for example, as illustrated in FIG. 12, the control unit 48 of the terminal device 16 causes the UI unit 46 of the terminal device 16 to display a function display screen 74 thereon and displays information on the linkage functions in the function display screen 74. For example, a button image for instructing execution of the linkage functions is displayed as information on the linkage functions. When the multifunction device (B) and the projector (C) are linked to each other, for example, a linkage function of projecting, by the projector (C), an image generated by scanning by the multifunction device (B), or a linkage function of printing, by the multifunction device (B), the image projected by the projector (C) may be executed. A button image for instructing execution of these linkage functions is displayed on the function display screen 74. For example, when the user designates a button image using the terminal device 16 and instructs execution of the linkage function, execution instruction information indicating the execution instruction of the linkage function is transmitted from the terminal device 16 to the image forming device 10 and the projector 12. When receiving the execution instruction information, the image forming device 10 and the projector 12 execute the linkage functions designated by the user.

A device to be linked may be designated by the operation of the user. For example, the image forming device 10 and the projector 12 are captured by the camera 42, so that a device image 70 associated with the image forming device 10 and a device image 72 associated with the projector 12 are displayed in the UI unit 46 of the terminal device 16 as illustrated in FIG. 11. The image associated with the device may be an image obtained by capturing by the camera 42 or an image prepared in advance and associated with the identified device (for example, a schematic image (for example, an icon)). When the user designates the device images 70 and 72 on the device display screen 68, the image forming device 10 and the projector 12 are designated as the devices to be linked. For example, when the user designates the device image 70, the marker AR technique or the markerless AR technique is applied to the device image 70, and thus, the image forming device 10 is specified (identified). Similarly, when the user designates the device image 72, the marker AR technique or the markerless AR technique is applied to the device image 72, and thus, the projector 12 is specified (identified). As a result, the linkage functions executed by the image forming device 10 and the projector 12 are specified, and information on the linkage functions is displayed on the UI unit 46 of the terminal device 16.

As another example, the user may touch the device image 70 on the device display screen 68 and operates with a finger or the like (for example, traces with a finger or the like) to the device image 72 to designate the device images 70 and 72, so that the image forming device 10 and the projector 12 are designated as the devices to be linked. The order of touching the device images 70 and 72 and the direction of tracing may be opposite to those in the above example. Of course, any screen contact unit other than a finger such as a pen for tracing the device display screen 68 may be used. When the user connects the device image 70 and the device image 72, the device images 70 and 72 may be designated, and as a result, the image forming device 10 and the projector 12 may be designated as the devices to be linked. When the user superimposes the device image 70 and the device image 72, the device images 70 and 72 may be designated, and as result, the image forming device 10 and the projector 12 may be designated as the devices to be linked. The devices to be linked may be designated by a drawing operation such as circling, or the devices to be linked may be designated by designating device images associated with the devices to be linked within a preset time. In a case of releasing the linkage, the user may designate the device to be released on the device display screen 68, or may press a linkage release button. In the case where a device that is not to be linked is included in the image, the user may exclude the device from a group of devices to be linked by designating the device on the device display screen 68. A device to be released may be designated by a preset operation such as adding a cross mark or the like.

Each device to be linked may be captured separately. For example, each device to be linked is identified by dividing the capturing by the camera 42 plural times. When the capturing by the camera 42 is divided plural times, the device identification information of the device identified at each capturing time is stored in the storage unit of the server 14 or the terminal device 16. For example, the image forming device 10 is captured while the image forming device 10 is included in the capturing area of the camera 42, and then the projector 12 is captured while the projector 12 is included in the capturing area of the camera 42. As a result, the image data of the image forming device 10 and the image data of the projector 12 are generated, and the marker AR technique or the markerless AR technique is applied to each image data, so that the image forming device 10 and the projector 12 are specified (identified), and the linkage functions using the functions of the image forming device 10 and the projector 12 are specified (identified). For example, the respective devices to be linked are arranged close to each other, and both the image forming device 10 and the projector 12 are not necessarily included together in the capturing area of the camera 42. In some cases, it is possible to cope with the situation by changing the angle of the capturing area of the camera 42 or by enlarging or reducing the capturing area. However, when it is not possible to cope with the situation by such an operation, dividing the capturing plural times may also be a solution to identify the devices to be linked.

As another example, a device to be linked may be preset as a basic linkage device. For example, it is assumed that the image forming device 10 is preset as a basic linkage device. The device identification information of the basic linkage device may be stored in the storage unit of the server 14 or the terminal device 16 in advance. The user may use the terminal device 16 to designate the basic linkage device. When the basic linkage device is set, the user captures the device to be linked other than the basic linkage device by the camera 42 of the terminal device 16. As a result, the device to be linked is specified (identified), and the linkage function using the functions that the basic linkage device and the captured device have is specified (identified).

In the above example, a marker AR technique or a markerless AR technique is used, but a position information AR technique may be used. For example, the terminal device 16 has a GPS function, acquires terminal position information indicating the position of the terminal device 16 itself, and transmits the terminal position information to the server 14. The control unit 36 of the server 14 refers to the position association information indicating the association between the device position information indicating the installation position of the device and the device identification information, and specifies, as a linkage candidate device, each device arranged within a range which is preset based on the position of the terminal device 16. For example, it is assumed that a multifunction device, a PC, a printer, and a scanner are arranged within a range which is preset based on the position of the terminal device 16. In this case, the multifunction device, the PC, the printer, and the scanner are specified as the linkage candidate device. The device identification information of each linkage candidate device is transmitted from the server 14 to the terminal device 16 and displayed on the UI unit 46 of the terminal device 16. As the device identification information, an image of the linkage candidate device may be displayed, or a character string such as a device ID may be displayed. The user designates the device to be linked from the linkage candidate device group displayed on the UI unit 46. The device identification information of the device to be linked designated by the user is transmitted from the terminal device 16 to the server 14, and the linkage function is specified on the server 14 based on the device identification information of the device to be linked. In the UI unit 46 of the terminal device 16, information on the linkage function is displayed. The linkage candidate device specification process and the linkage function specification process may be performed by the terminal device 16.

In a case where a device to be captured cannot be identified even by applying the AR technology or the like, the device image representing the device to be captured may not be displayed on the device display screen. Therefore, the visibility of the identified device is improved. For example, in a case where an identified device and an unidentified device are mixed and each device is captured by the camera 42, the device image representing the unidentified device is not displayed. As a result, since the device image representing the identified device is displayed without being buried in the device image representing the unidentified device, the visibility of the identified device is improved. Further, the device image representing the identified device may be emphasized and displayed. For example, the device image representing the identified device may be displayed in a specific color, the edge of the device image may be emphasized and displayed, the device image may be enlarged and displayed, the device image may be displayed in three dimensions, or the device image may be vibrated and displayed. Therefore, the visibility of the identified device is improved.

Figure 13:
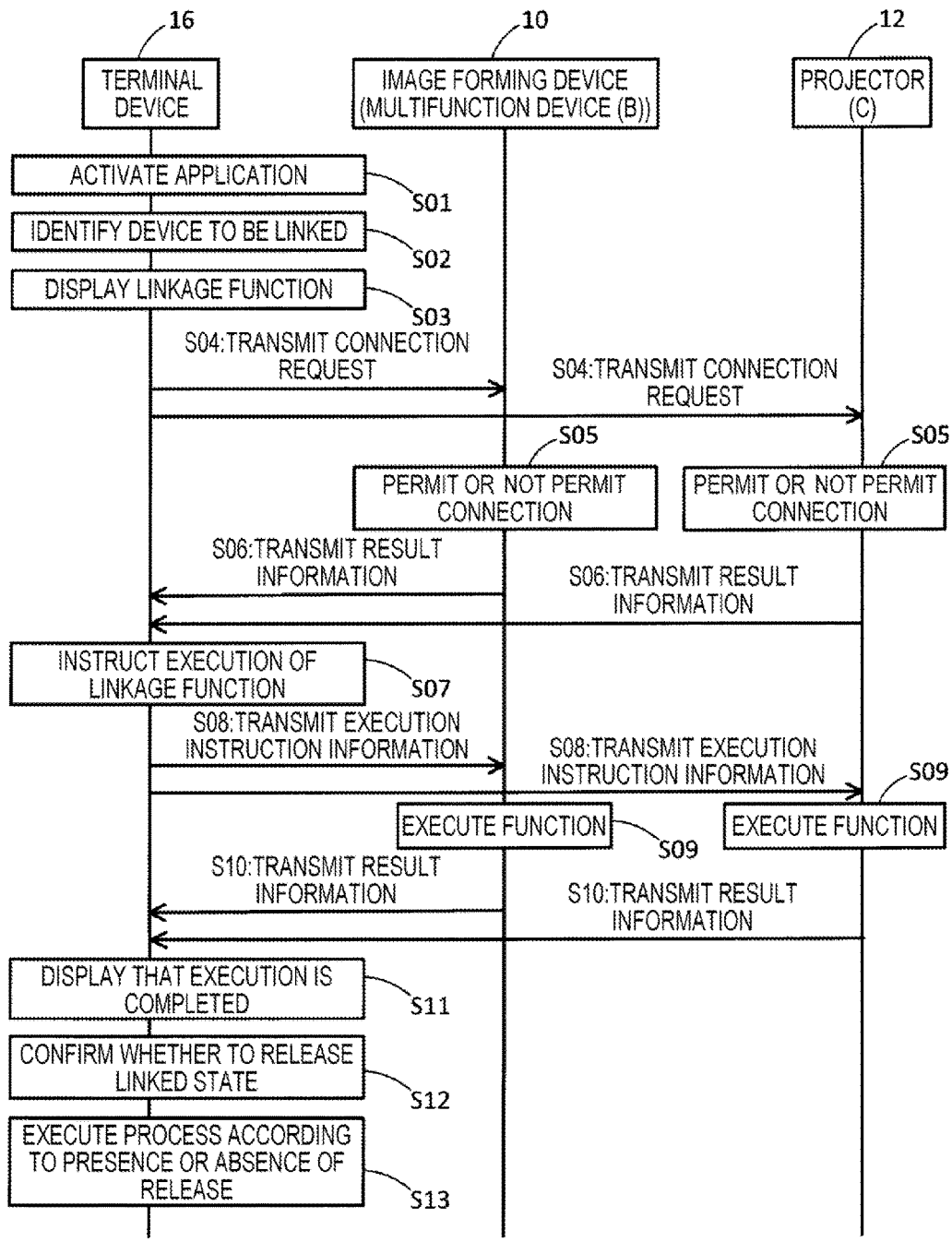
FIG. 13 is a sequence diagram illustrating a connection process.

Hereinafter, the process when executing the function that the device has will be described. As an example, the process when executing the linkage function will be described. In this case, a connection request is transmitted from the terminal device 16 to the device to be linked, and the terminal device 16 and the device to be linked are connected. Hereinafter, the connection process will be described with reference to FIG. 13. FIG. 13 is a sequence diagram illustrating the process.

First, the user uses the terminal device 16 to instruct activation of an application (program) for executing a device function. The control unit 48 of the terminal device 16 activates the application in response to the instruction (S01). The application may be stored in the storage unit 44 of the terminal device 16 in advance, or may be downloaded from the server 14 or the like.

Next, the device to be linked is identified by applying the marker AR technique, the markerless AR technique, or the position information AR technique (S02). Of course, the device to be linked may be identified by a technology other than the AR technology. When the marker AR technique or the markerless AR technique is used, for example, the user captures the device to be linked by the camera 42 of the terminal device 16. As an example, when the image forming device 10 (multifunction device (B)) and the projector 12 (projector (C)) are used as linkage devices, the user captures the image forming device 10 and the projector 12 with the camera 42. The device identification information of each of the image forming device 10 and the projector 12 is acquired and the image forming device 10 and the projector 12 are identified as devices to be linked. When the position information AR technique is applied, the position information of each of the image forming device 10 and the projector 12 is acquired, and the device identification information of each of the image forming device 10 and the projector 12 is specified based on the position information, so that the image forming device 10 and the projector 12 are identified.

For example, when the user gives an instruction to display the linkage function, the linkage function that uses the functions that the plural identified devices have is identified. In the UI unit 46 of the terminal device 16, information on the identified linkage function is displayed (S03). The process of identifying the linkage function may be performed by the server 14 or may be performed by the terminal device 16.

Next, when the linkage function to be executed is designated by the user in the terminal device 16, the terminal device 16 transmits information indicating a connection request to the device to be linked (for example, the image forming device 10 and the projector 12) that executes the linkage function (S04). For example, when address information indicating the address of the device to be linked is stored in the server 14, the terminal device 16 acquires the address information of the device to be linked from the server 14. In a case where the device identification information includes address information, the terminal device 16 may acquire each address information from the identification information of the device to be linked. As another example, the terminal device 16 may store the address information of the device to be linked. Of course, the terminal device 16 may acquire the address information of the device to be linked by another method. The terminal device 16 transmits the information indicating the connection request to the device to be linked (for example, the image forming device 10 and the projector 12) using the address information of the device to be linked (for example, the image forming device 10 and the projector 12).

When receiving the information indicating the connection request, the image forming device 10 and the projector 12 permit or do not permit connection with the terminal device 16 (S05). For example, when the image forming device 10 and the projector 12 correspond to devices which are not permitted to connect or devices in which the number of devices requesting connection therewith exceeds an upper limit, connection is not permitted. When the connection from the terminal device 16 is permitted, the changing operation may be prohibited such that setting information unique to the image forming device 10 and the projector 12 is not changed from the terminal device 16. For example, it may be prohibited to change the color parameters of the image forming device 10, the setting time when shifting to power saving, and the like. As a result, the security for the device to be linked is improved. As another example, when linking devices, change of setting information may be restricted compared to a case where the devices are used alone without being linked. For example, it may be permitted to change a smaller number of setting items compared to the case where the device is used alone. In addition, browsing of other users' personal information such as the operation history may be prohibited. As a result, the security for the user's personal information is improved.

Result information indicating permission or non-permission of the connection is transmitted from the image forming device 10 and the projector 12 to the terminal device 16 (S06). When the connection to the image forming device 10 and the projector 12 is permitted, communication is established between the terminal device 16, and the image forming device 10 and the projector 12.

Next, the user uses the terminal device 16 to instruct execution of the linkage function (S07). In response to this instruction, execution instruction information indicating execution instruction of the linkage function is transmitted from the terminal device 16 to the image forming device 10 and the projector 12 (S08). The execution instruction information transmitted to the image forming device 10 includes information indicating a process to be executed by the image forming device 10 (for example, job information), and the execution instruction information transmitted to the projector 12 includes information indicating a process to be executed by the projector 12 (for example, job information).

When receiving the execution instruction information, the image forming device 10 and the projector 12 execute the function according to the execution instruction information (S09). For example, similarly to the function of transferring the scan data from the image forming device 10 (multifunction device (B)) to the projector 12 (PC (A)) and projecting the data by the projector 12, when the linkage function includes a process of transmitting and receiving data between the image forming device 10 and the projector 12, communication is established between the image forming device 10 and the projector 12. In this case, for example, the execution instruction information transmitted to the image forming device 10 includes address information of the projector 12, and the execution instruction information transmitted to the projector 12 includes address information of the image forming device 10. Then, communication is established between the image forming device 10 and the projector 12 using these pieces of address information.

When the execution of the linkage function is completed, information indicating completion of execution of the linkage function is transmitted from the image forming device 10 and the projector 12 to the terminal device 16 (S10). Information indicating that execution of the linkage function has been completed is displayed on the UI unit 46 of the terminal device 16 (S11). When information indicating completion of execution is not displayed even though a preset time has elapsed since the execution instruction is given, the control unit 48 of the terminal device 16 may cause the UI unit 46 to display information indicating an error, and again transmit execution instruction information or information indicating a connection request to the image forming device 10 and the projector 12.

Next, the user confirms whether or not to release the linked state between the image forming device 10 and the projector 12 (S12), and a process is executed according to the presence or absence of the release (S13). When releasing the linked state, the user gives an instruction of release using the terminal device 16. As a result, the communication of the terminal device 16 with the image forming device 10 and the projector 12 is released. Similarly, the communication between the image forming device 10 and the projector 12 is also released. When the linked state is not to be released, the execution instruction may be given continuously.

Further, the number of devices to be linked may be increased. For example, the device identification information of a third device may be acquired, and the linkage function executed by linking the three devices including the image forming device 10 and the projector 12 may be specified. Information indicating that the image forming device 10 and the projector 12 are already identified as a linkage function is stored in the server 14 or the terminal device 16.

The device identification information indicating the device to be linked and the linkage function information indicating the executed linkage function may be stored in the terminal device 16 or the server 14. For example, user account information (user identification information) of the user who uses the terminal device 16 may be acquired, and history information indicating the association between the user account information, the device identification information indicating the device to be linked, and the linkage function information indicating the executed linkage function may be created and stored in the terminal device 16 or the server 14. The history information may be created by the terminal device 16 or may be created by the server 14. By referring to the history information, it is specified what type of device group is used for a certain linkage function to be executed.

The devices to be linked (for example, the image forming device 10 and the projector 12) may store the user account information of the user who has requested the connection and the terminal identification information indicating the terminal device 16 of the connection request source as the history information. The user using the device is specified by referring to this history information. For example, a user may be specified by utilizing the history information in the case of specifying the user who is using the device when the device is broken or in the case of performing the charging process on consumables. The history information may be stored in the server 14 or the terminal device 16 or may be stored in another device.

The user account information is stored, for example, in the storage unit 44 of the terminal device 16 in advance, and the control unit 48 of the terminal device 16 functions as an example of the user identification unit, reads the user account information of the user from the storage unit 44, and identifies the user who uses the terminal device 16. When user account information of plural users is stored in the storage unit 44, the user designates his/her own user account information using the terminal device 16. As a result, the user account information of the user is read and the user is identified. As another example, the control unit 48 of the terminal device 16 may identify the user by reading the user account information of the user logged in to the terminal device 16. As still another example, when only one user account information is stored in the same terminal device 16, the control unit 48 of the terminal device 16 may identify the user by reading the user account information. When the user account is not set and the user account information is not created, the initial setting is performed, so that the user account information is created.

The use history of the linkage function may be managed for each user, and information indicating the linkage function used in the past by the user indicated by the read user account information may be displayed on the UI unit 46 of the terminal device 16. The information indicating the use history may be stored in the terminal device 16 or may be stored in the server 14. In addition, information indicating a linkage function used at a frequency equal to or higher than a preset use frequency may be displayed. The user's effort on the operation related to the linkage function is reduced by providing such a shortcut function.

When a solo function is executed, information indicating an execution instruction of the solo function is transmitted from the terminal device 16 to the device that executes the solo function. The device executes the solo function according to the execution instruction.

<Second Exemplary Embodiment>

Hereinafter, a system according to a second exemplary embodiment will be described. In the first exemplary embodiment, the display of linkage functions is controlled by selecting a device image associated with a device. In the second exemplary embodiment, however, the display of linkage functions is controlled by selecting a function image associated with a function. The function image may be, for example, an image associated with software (an application, etc.) or an image associated with a device in which a process is performed (a device present in the real space). The function image is, for example, an image such as an icon, which may be regarded as a virtual image in the sense of distinguishing from an image representing an actual external appearance of a device as hardware (for example, a photograph) or an image representing the device itself. For example, when a function image associated with software is selected by the user, information indicating the linkage function executable using the software associated with the function image is displayed. Hereinafter, the second exemplary embodiment will be described in detail.

FIG. 14 illustrates an exemplary linkage function management table according to the second exemplary embodiment. The linkage function management table is information indicating linkage functions executable using plural functions. In the linkage function management table, as an example, function IDs (for example, IDs for identifying software), information indicating function names (for example, software names), and information indicating linkage functions executable using plural functions are associated with each other. The linkage functions executable using plural functions are specified by referring to the linkage function management table. For example, software α as a function is software that transmits data, and software β as a function is software that sets a password for the data. For example, a linkage function of setting a password for data and then transmitting the data is implemented by combining the software α and the software β. For other software, executable linkage functions are similarly specified.

Figures 15, 16:
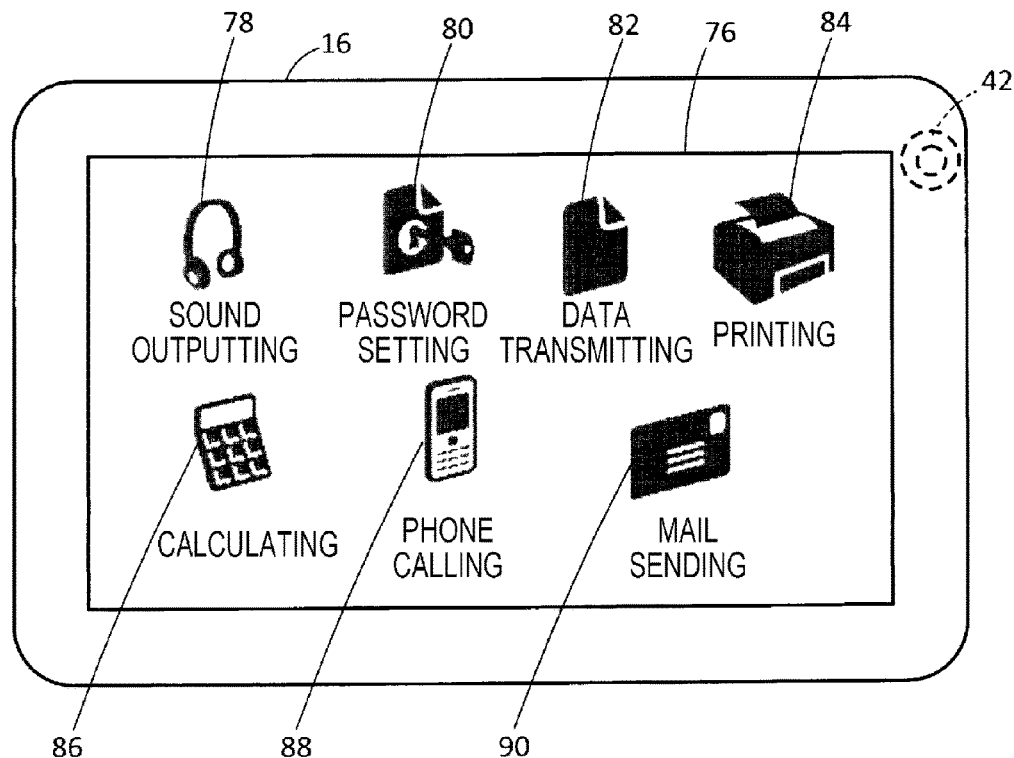
FIG. 15 is a diagram illustrating an example of a screen.
FIG. 16 is a diagram illustrating an example of a linkage function management table according to a third exemplary embodiment.

FIG. 15 illustrates a screen 76 displayed on the UI unit 46 of the terminal device 16. One or more function images are displayed on the screen 76. For example, function images associated with software installed in the terminal device 16 are displayed on the screen 76. In the example illustrated in FIG. 15, function images 78, 80, 82, 84, 86, 88, 90 are displayed.

The function image 78 is an image associated with a sound playback function (for example, an image associated with sound playback software or an image associated with a device that plays sound (for example, a playback machine)). When the user selects the function image 78 and gives an instruction to activate the sound playback function, for example, the sound playback software is activated to play sound, or the playback machine plays sound.

The function image 80 is an image associated with a password setting function (for example, an image associated with password setting software). When the user selects the function image 80 and gives an instruction to activate the password setting function, for example, the password setting software is activated, and the password setting process is performed on data or the like.

The function image 82 is an image associated with a data transmission function (for example, an image associated with data transmission software). When the user selects the function image 82 and gives an instruction to activate the data transmission function, for example, the data transmission software is activated, and data to be transmitted is transmitted to the transmission destination.

The function image 84 is an image associated with a print function (for example, an image associated with print software or an image associated with a device that performs printing (for example, a printer or a multifunction device)). When the user selects the function image 84 and gives an instruction to activate the print function, for example, the print software is activated, and printing is performed according to the set printing conditions.

The function image 86 is an image associated with a calculation function (for example, an image associated with calculation software). When the user selects the function image 86 and gives an instruction to activate the calculation function, for example, the calculation software is activated.

The function image 88 is an image associated with a telephone function. When the user selects the function image 88 and gives an instruction to activate the telephone function, a telephone number input screen or an address book is displayed and a phone call is made to the telephone number designated by the user.

The function image 90 is an image associated with a mail function (for example, an image associated with mail software). When the user selects the function image 90 and gives an instruction to activate the mail function, for example, the mail software is activated.

Similarly to the first exemplary embodiment, when the user designates plural function images, the specifying unit 38 identifies plural functions associated with the plural function images designated by the user and specifies linkage functions executable using the plural functions by referring to the linkage function management table illustrated in FIG. 14. Information indicating the linkage functions is displayed on the UI unit 46 of the terminal device 16. For example, when the user connects the plural function images to each other or superimposes the plural function images on each other, the plural function images are designated and information indicating linkage functions is displayed. In the example illustrated in FIG. 15, for example, when the function images 80 and 82 are designated (for example, when the function images 80 and 82 are connected to each other or superimposed on each other), information indicating linkage functions executable using the function of setting a password and the function of transmitting data is displayed. The function images are displayed on, for example, the home screen of the smartphone or the desktop screen of the personal computer. When plural function images are designated on the screen, information indicating linkage functions is displayed on the screen. When three or more function images are designated, information indicating linkage functions executable using three or more functions may be displayed.

<Third Exemplary Embodiment>

Hereinafter, a system according to a third exemplary embodiment will be described. In the third exemplary embodiment, when the device image and the function image are designated by the user, information indicating linkage functions executable using the device associated with the device image and the function associated with the function image is displayed. Hereinafter, the third exemplary embodiment will be described in detail.

FIG. 16 illustrates an exemplary linkage function management table according to the third exemplary embodiment. The linkage function management table is information indicating linkage functions executable using devices and functions (for example, software). In the linkage function management table, as an example, a combination of IDs (for example, a combination of a device ID and a function ID), information indicating device names and function names, and information indicating linkage functions executable using devices and functions are associated with each other. The linkage functions executable using devices and functions are specified by referring to the linkage function management table. For example, a linkage function of transmitting data using the PC (A) is implemented by combining, for example, the PC (A) as a device A with the data transmission function as a function α. For other devices and functions, executable linkage functions are similarly specified.

Similarly to the first and second exemplary embodiments, when the user designates a device image and a function image, the specifying unit 38 identifies a device and a function associated with the device image and the function image, respectively, which are designated by the user, and specifies linkage functions executable using the device and the function by referring to the linkage function management table illustrated in FIG. 16. Information indicating the linkage functions is displayed on the UI unit 46 of the terminal device 16. For example, when the user connects the device image and the function image to each other or superimposes the device image and the function image on each other, the device image and the function image are designated, and information indicating linkage functions is displayed. When one or more device images and one or more function images are designated, information indicating linkage functions executable using the one or more devices and the one or more functions may be displayed.

Figure 17:
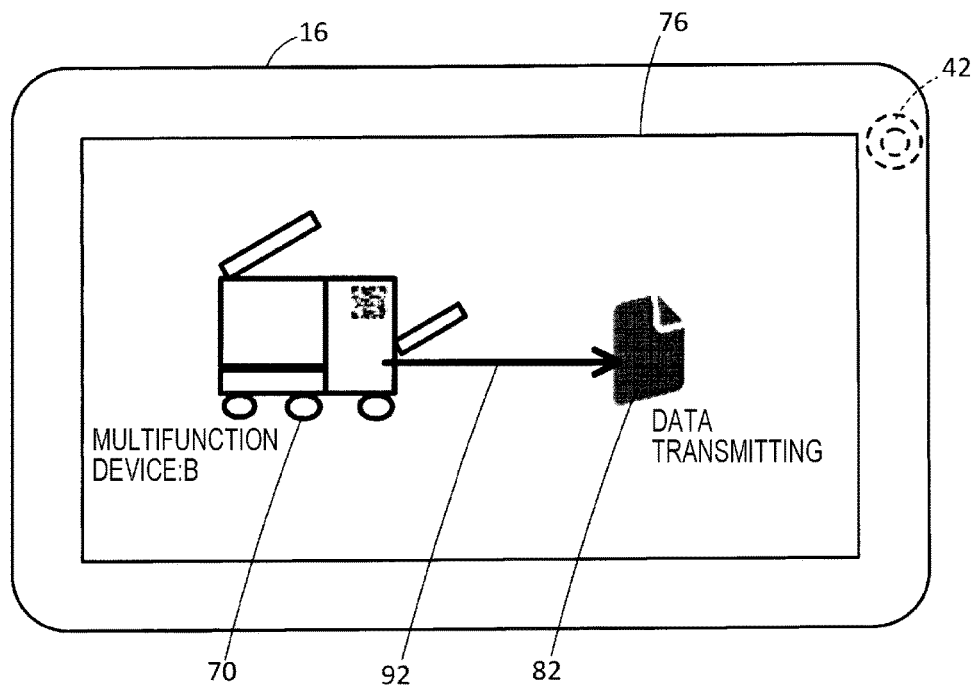
FIG. 17 is a diagram illustrating an example of a screen.

FIG. 17 illustrates a screen 76 displayed on the UI unit 46 of the terminal device 16. As an example, the device image 70 and the function image 82 are displayed on the screen 76. The device image 70 is an image associated with the multifunction device (B), and the function image 82 is an image associated with the data transmission function (for example, an image associated with data transmission software). For example, when the multifunction device (B) is identified by the above-described AR technique or the like, the device image 70 associated with the multifunction device (B) is displayed on the screen 76. In addition, when the data transmission software (α) is installed in the terminal device 16, the function image 82 associated with the data transmission software (α) is displayed on the screen 76.

For example, when the user connects the device image 70 and the function image 82 to each other as indicated by an arrow 92, the specifying unit 38 identifies the multifunction device (B) associated with the device image 70 as a device to be linked, and identifies the data transmission software (α) associated with the function image 82 as a function to be linked. Then, the specifying unit 38 specifies linkage functions executable using the multifunction device (B) and the data transmission software (α) by referring to the linkage function management table illustrated in FIG. 16. Information indicating the linkage functions is displayed on the UI unit 46 of the terminal device 16. For example, when the user traces (for example, touches an image and traces) between plural images on screen 76 using a pointer (for example, the user's finger, pen, stylus, etc.), the plural images are connected to each other. The control unit 48 of the terminal device 16 detects the contact of the pointer on the screen 76 and detects the movement of the indicator on the screen 76. When the user connects the function image 82 to the device image 70, information indicating linkage functions executable using the multifunction device (B) and the data transmission software (α) is also displayed. When the user connects one or more device images and one or more function images to each other, information indicating linkage functions executable using the one or more devices and the one or more functions may be displayed.

Figure 18:
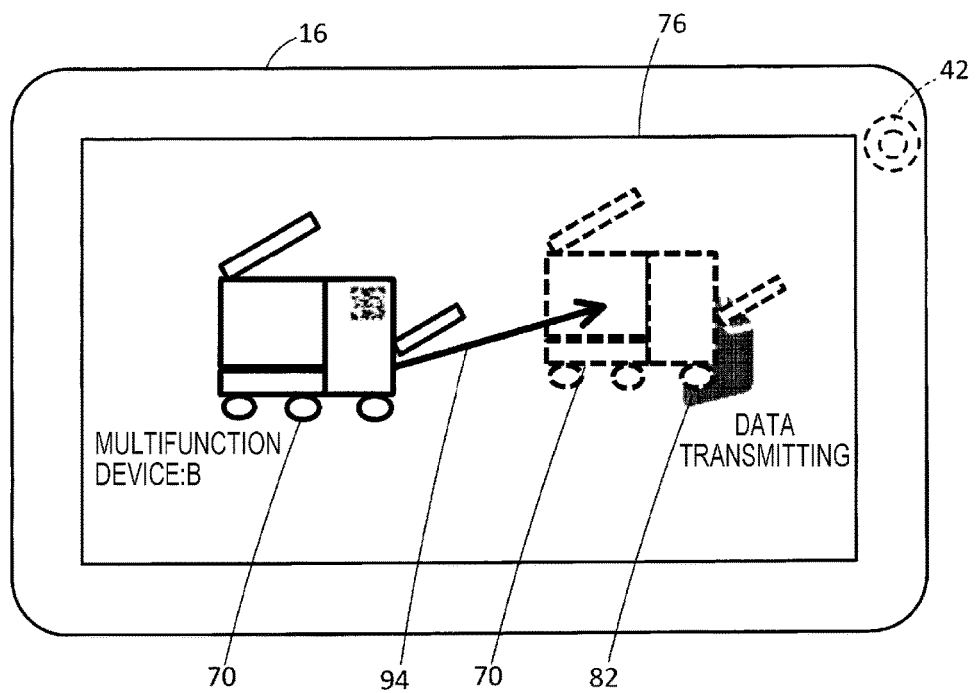
FIG. 18 is a diagram illustrating an example of a screen.

FIG. 18 illustrates another operation example. When the user moves the device image 70 to the function image 82 to superimpose the device image 70 on the function image 82, for example, as indicated by an arrow 94, the specifying unit 38 identifies the multifunction device (B) associated with the device image 70 as a device to be linked, and identifies the data transmission software (α) associated with the function image 82 as a function to be linked. Then, the specifying unit 38 specifies linkage functions executable using the multifunction device (B) and the data transmission software (α) by referring to the linkage function management table illustrated in FIG. 16. Information indicating the linkage functions is displayed on the UI unit 46 of the terminal device 16. For example, a user may perform a dragging and dropping operation using a pointer to superimpose an image on another image. In the example illustrated in FIG. 18, the user drags the device image 70 and drops the device image 70 at a position where the device image 70 is superimposed on the function image 82. An image to be superimposed may be designated according to the user's voice instruction. When the user superimposes the function image 82 on the device image 70, information indicating linkage functions executable using the multifunction device (B) and the data transmission software (α) is also displayed. When the user superimposes one or more device images and one or more function images on each other, information indicating linkage functions executable using the one or more devices and the one or more functions may be displayed.

Figure 19:
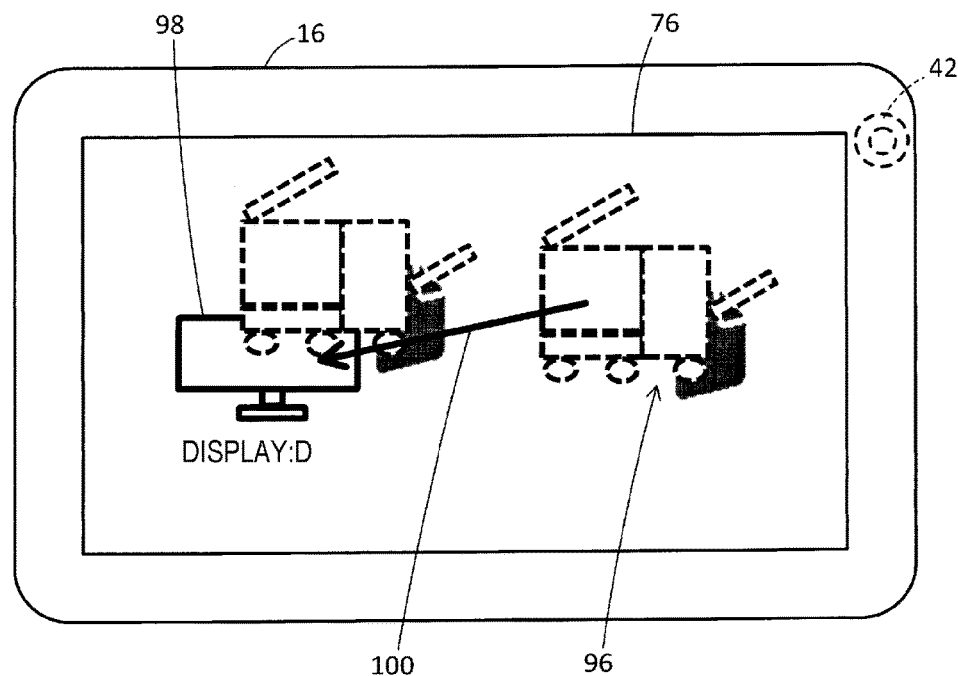
FIG. 19 is a diagram illustrating an example of a screen.

When plural images are superimposed, a new image representing the superimposed state may be generated and displayed. For example, as illustrated in FIG. 18, it is assumed that the device image 70 and the function image 82 are superimposed on each other. In this case, as illustrated in FIG. 19, a new composite image 96 generated by grouping the superimposed device image 70 and function image 82 is displayed. The composite image 96 may be generated, for example, by the control unit 48 of the terminal device 16, or may be generated by the control unit 36 of the server 14. The composite image 96 is an image representing a state where the device image 70 is superimposed on the function image 82. The composite image 96 may be an image representing a state where the device image 70 is superimposed on the function image 82 as it is, or may be an image schematically representing the state (for example, an icon). Even when the composite image 96 is generated, the original device image 70 and function image 82 are displayed in their original state.

In the first exemplary embodiment, when plural device images are superimposed, a composite image representing a state where the plural device images are superimposed may be generated. In the second exemplary embodiment, when plural function images are superimposed, a composite image representing a state where the plural function images are superimposed may be generated.

When the composite image 96 is generated as described above, the control unit 48 of the terminal device 16 leaves the composite image 96 and displays the composite image 96 on the screen 76. When the composite image 96 is superimposed on another device image or another function image, a device associated with the device image or a function associated with the function image is identified as a device or function to be linked. For example, as illustrated in FIG. 19, it is assumed that a display (D) is identified and a device image 98 associated with the display (D) is displayed on the screen 76. When the composite image 96 is moved as indicated by an arrow 100 to be superimposed on the device image 98, the display (D) is identified as a device to be linked. In this case, the specifying unit 38 specifies linkage functions executable using the multifunction device (B), the data transmission software (α), and the display (D) by referring to the linkage function management table illustrated in FIG. 16. Information indicating the linkage functions is displayed on the UI unit 46 of the terminal device 16. Further, a new composite image representing a state where the composite image 96 is superimposed on the device image 98 associated with the display (D) is generated and displayed. When the composite image 96 and the device image 98 are connected to each other, information indicating linkage functions may be displayed. Further, when the composite image 96 and the function image are superimposed on each other or when the composite image 96 and the function image are connected to each other, information indicating linkage functions executable using the function associated with the function image, the multifunction device (B), and the data transmission software (α) is displayed.

The devices and functions to be linked may be increased by displaying a composite image as described above and superimposing the composite image on a device image associated with a next candidate device or a function image associated with the function. Further, the composite image represents a state where the images associated with the devices or functions to be linked are superimposed. Thus, displaying composite images makes it easy for the user to visually understand what devices and functions are designated as the devices or functions to be linked.

The above-described composite image may be used as a shortcut image when executing the linkage function next time and thereafter. For example, when the user uses the terminal device 16 to give an instruction to register the composite image as a shortcut image, a registration screen is displayed on the UI unit 46 of the terminal device 16. This registration screen displays the composite image and information indicating registration contents of linkage functions executable using devices and functions to be linked. For example, the names of the linkage functions, the outline of the linkage functions, and information indicating the devices and functions necessary for the linkage are displayed as information indicating the registration contents. The user may use the terminal device 16 to edit the registration contents (for example, the names of the linkage functions, the outline of the linkage functions, etc.). When the user gives a registration instruction on the registration screen, the composite image is registered as a shortcut image. Further, when the registration contents are edited by the user, the edition contents are also associated with the composite image and registered. A shortcut image as the composite image is generated and displayed on the UI unit 46 of the terminal device 16. The shortcut image may be generated by the terminal device 16 or may be created by the server 14. When plural shortcut images are generated and registered, the UI unit 46 of the terminal device 16 may display a list of the shortcut images. Information indicating the shortcut image and the registration content is stored in the terminal device 16. As another example, the information indicating the shortcut image and the registration contents may be stored in the server 14 in association with the user account information. In this case, when the user account information is transmitted from the terminal device 16 to the server 14, the information associated with the user account information (the information indicating the shortcut image and the registration contents) is transmitted from the server 14 to the terminal device 16 and displayed on the terminal device 16.

The shortcut image may include information indicating the status of the device or function (for example, an image, etc.) for each device or function to be linked. For example, when a device or function to be linked is in a state capable of executing the linkage function, an image indicating the state (for example, a green or blue image) is displayed as the information indicating the status. For example, when a device or function to be linked is in a state incapable of executing the linkage function, an image indicating the state (for example, a white or red image) is displayed as the information indicating the status. The state capable of executing the linkage function refers to, for example, a state where the device or function is not being currently used or a state where the device or function is not broken down. The state incapable of executing the linkage function refers to, for example, a state where the device or function is being currently used or a state where the device or function is broken down. For example, the terminal device 16 acquires the information indicating the status of the device to be linked from the device to be linked, acquires the information indicating the status of the function to be linked, and displays status information based on the acquired information. The acquisition of the information may be performed by the server 14.

In a case where a shortcut image is displayed on the UI unit 46 of the terminal device 16, when the user designates a shortcut image and instructs the execution of a linkage function (for example, when the user has clicked or double-clicked the shortcut image), the information indicating the linking function associated with the shortcut image may be displayed, or the execution of the linkage function may be controlled.

As described above, the linkage function and the shortcut image are managed in association with each other, so that the user's burden to perform the operation to execute the linkage function next time and thereafter is reduced.

After an image to be superimposed has been operated by the user (for example, after the dragging operation), when the operation is released (for example, when the dropping operation is performed) in an area where no image is displayed on the screen 76, the linkage function may be released. For example, it is assumed that the device image 70 is superimposed on the function image 82 as illustrated in FIG. 18, and the composite image 96 is generated and displayed as illustrated in FIG. 19. In this case, when the user releases the operation of the composite image 96 in an area where no image is displayed on the screen 76, the linkage function executable using the multifunction device (B) and the data transmission software (α) is released. That is, when the user drags the composite image 96 to an area where no image is displayed, and drops the composite image 96 in that area, the linkage function is released. In this manner, the linkage function may be released by a simple operation. Of course, a button image (for example, an icon) for releasing the linkage function may be displayed on the screen, and the user may release the linkage function by operating the button image (for example, by pressing the button image).

Further, when an image (for example, an icon) associated with data (also referred to as a file) is superimposed on a device image, the control unit 48 of the terminal device 16 may register the data as an object to be processed by the device associated with the device image. When a user gives an instruction to execute a process, the device performs the process designated by the user on the registered data. The data is, for example, document data, image data, or the like. For example, when document data is superimposed on a device image associated with a multifunction device, the document data is registered as an object to be processed by the multifunction device. When the user gives a print instruction to the multifunction device, the registered document data is printed by the multifunction device.

Further, when an image associated with data is superimposed on a function image, the control unit 48 of the terminal device 16 may register the data as an object to be processed by the function associated with the function image. When the user gives an instruction to execute a process, the process by the function is executed on the registered data. For example, when document data is superimposed on a function image associated with data transmission software, the document data is registered as an object to be transmitted. When the user gives a transmission instruction, the registered document data is transmitted to the destination.

Further, when a device image is superimposed on a function image after an image associated with data is superimposed on the device image and registered as an object to be processed, the control unit 48 of the terminal device 16 registers the data as an object to be processed by a linkage function executable using a device associated with the device image and a function associated with the function image. Further, when a function image is superimposed on a device image after an image associated with data is superimposed on the function image and registered as an object to be processed, the control unit 48 of the terminal device 16 registers the data as an object to be processed by a linkage function executable using a function associated with the function image and a device associated with the device image. When the user gives an instruction to execute the linkage function, the process by the linkage function is executed on the registered data.

Hereinafter, another operation for executing a linkage function will be described.

Figure 20:
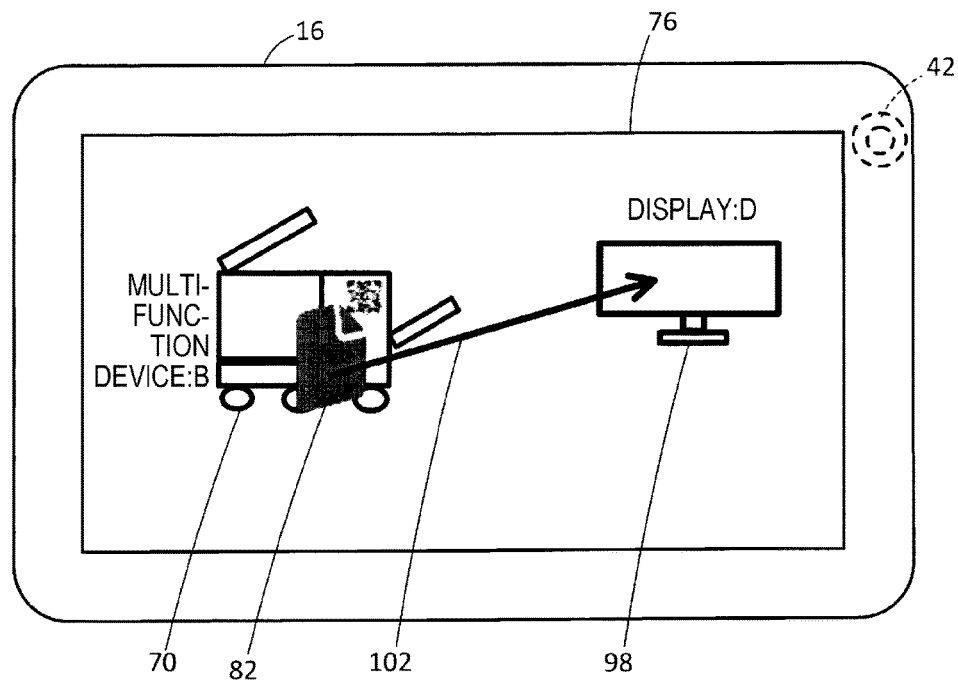
FIG. 20 is a diagram illustrating an example of a screen.
Figure 21:
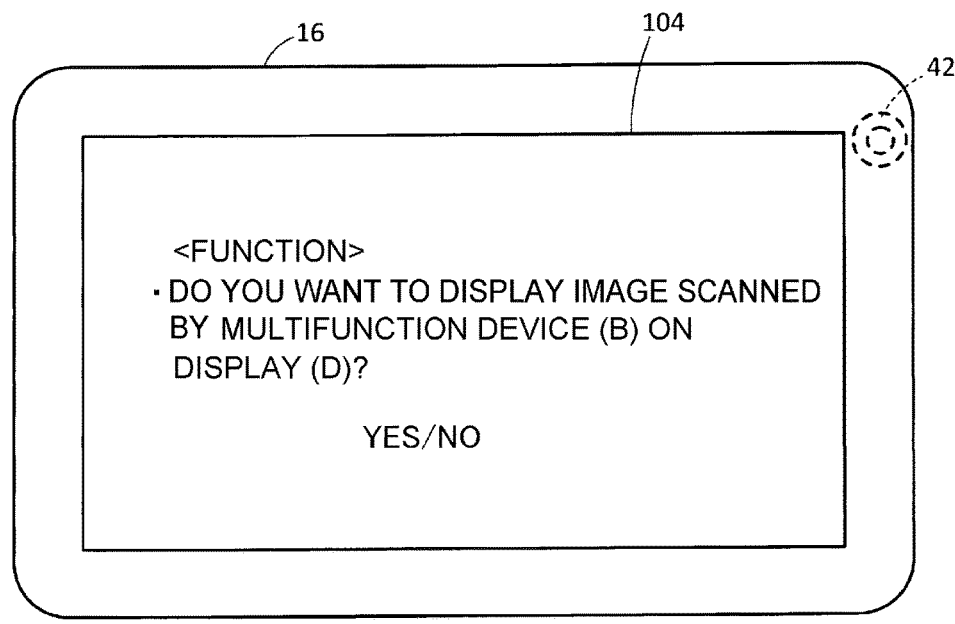
FIG. 21 is a diagram illustrating an example of a screen.

FIG. 20 illustrates a screen 76 displayed on the UI unit 46 of the terminal device 16. For example, when the user operates the function image 82 associated with the data transmission software (α) from the device image 70 associated with the multifunction device (B) to the device image 98 associated with the display (D) as indicated by an arrow 102, the specifying unit 38 specifies a linkage function executable using the data transmission software (α), the multifunction device (B), and the display (D). Information indicating the linkage function is displayed on the UI unit 46 of the terminal device 16. As the image operation, the user may designate the function image 82 and the device images 70 and 98, may connect the function image 82 and the device images 70 and 98, or may superimpose the function image 82 on the device images 70 and 98. The linkage function executable by the data transmission software (α), the multifunction device (B), and the display (D) is, for example, a function of transmitting image data generated by scanning performed by the multifunction device (B) to the display (D) and displaying the image data on the display (D). As illustrated in FIG. 21, a screen 104 is displayed on the UI unit 46 of the terminal device 16, and the information indicating the linkage function is displayed on the screen 104. When the user selects "YES," the linkage function is executed. When the user selects "NO," the screen returns to the screen for selecting an image.

Figure 22:
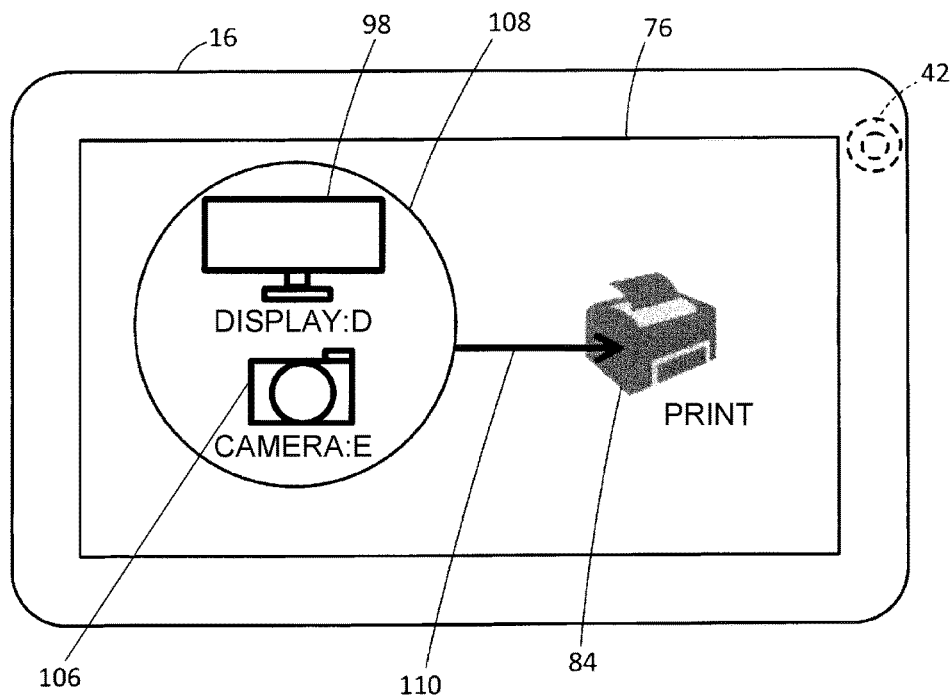
FIG. 22 is a diagram illustrating an example of a screen.

FIG. 22 illustrates another operation example. Device images 98 and 106 and a function image 84 are displayed on the screen 76 of the terminal device 16. For example, the device image 106 is an image associated with the display (D). When the display (D) and a camera (E) are identified by the AR technology or the like, the device image 98 associated with the display (D) and the device image 106 associated with the camera (E) are displayed. Further, the function image 84 is an image associated with a print function (for example, print software). For example, when the print software is installed in the terminal device 16, the function image 84 is displayed on the screen 76.

Figure 23:
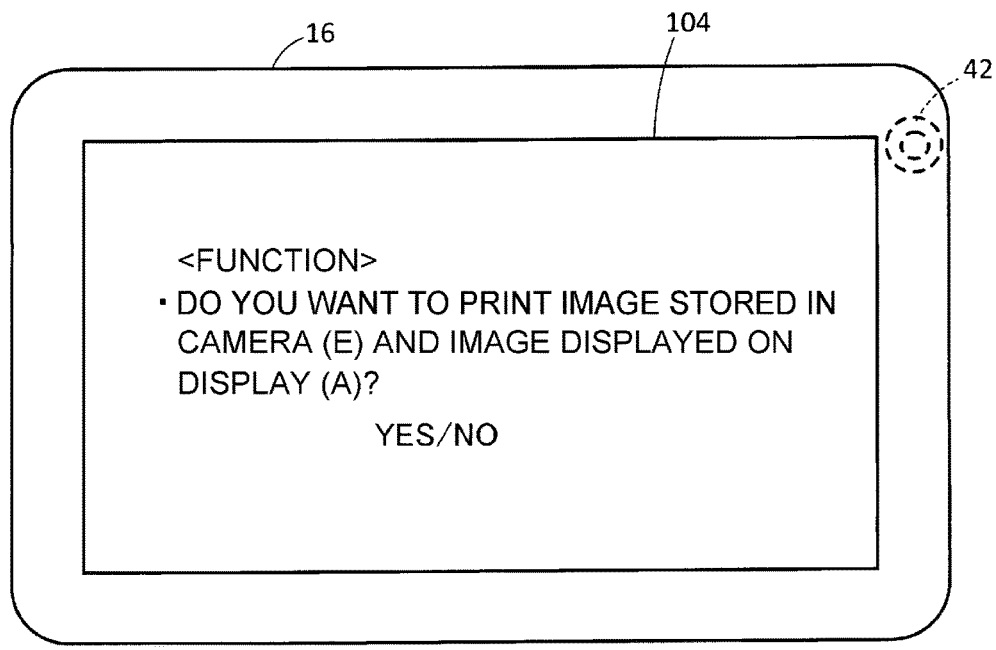
FIG. 23 is a diagram illustrating an example of a screen.

For example, when the user selects (for example, groups) plural device images (for example, the device images 98 and 106) as indicated by reference numeral 108, and then combines the plural device images and superimposes the plural device images on the function image 84 as indicated by an arrow 110, or connects the selected area and the function image 84 to each other, the specifying unit 38 specifies a linkage function executable using the display (D), the camera (E), and the print software. The linkage function is a function of printing images saved in the camera and images displayed in the display. Information indicating the linkage function is displayed on the UI unit 46 of the terminal device 16. For example, as illustrated in FIG. 23, a screen 104 is displayed on the UI unit 46 of the terminal device 16, and the information indicating the linkage function is displayed on the screen 104. When the user selects "YES," the linkage function is executed. When the user selects "NO," the screen returns to the screen 76 or the like.

In the example illustrated in FIG. 22, plural device images are selected, and then the plural selected device images are operated toward a function image. However, plural function images may be selected, and then the plural selected function images may be operated toward a device image. Further, a device image and a function image may be selected, and then the selected device image and the function image are operated toward another device image of function image. Of course, plural device images may be selected, and then the plural selected device images are operated toward another device image. Alternatively, plural function images may be selected, and then the plural selected function images may be operated toward another function image.

Figure 24:
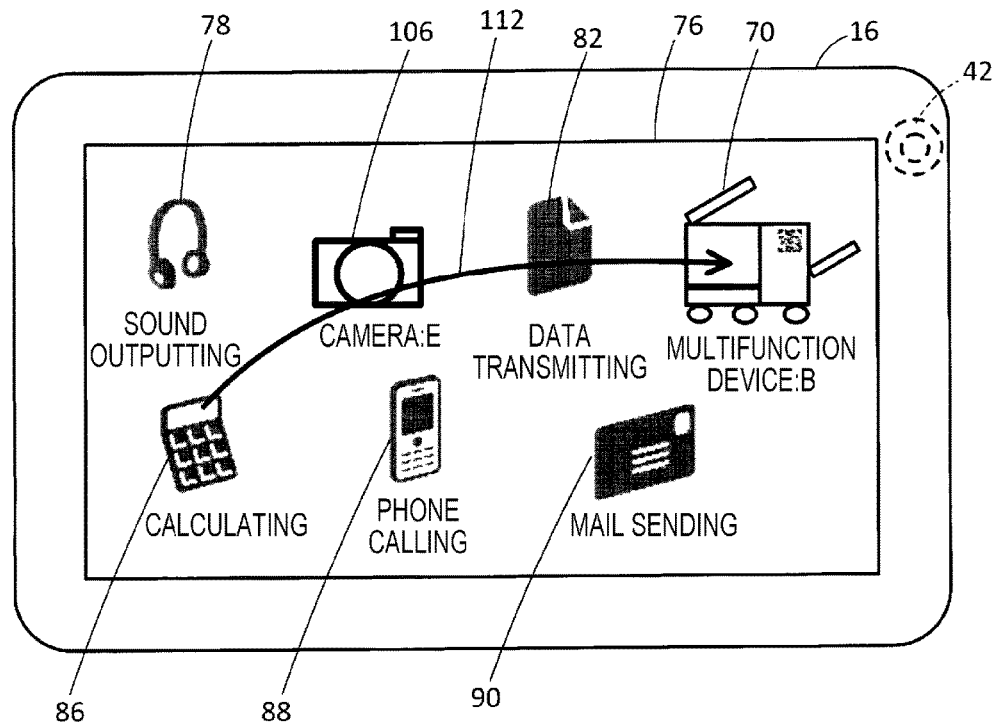
FIG. 24 is a diagram illustrating an example of a screen.

FIG. 24 illustrates still another operation example. It is assumed that device images 70 and 106 and function images 78, 82, 86, 88, and 90 are displayed on the screen 76 of the UI unit 46 of the terminal device 16. For example, it is assumed that a function associated with the function image 86 (for example, calculation software) and a multifunction device (B) associated with the device image 70 are to be linked. When the user performs an operation for the linkage, the user may operate a function image other than the function image 86 or a device image other than the device image 70 in some cases. For example, as an operation for linkage, in order to connect the function image 86 and the device image 70 to each other, when the user traces using a pointer from the function image 86 to the device image 70 on the screen 76, as indicated by a locus 112 (when the user touches the screen 76), the device image 106 and the function image 82 displayed along the locus 112 are designated as well. In this case, the camera (E) associated with the device image 106 and the data transmission software (α) associated with the function image 82 may also be designated as objects to be linked. This designation is not intended by the user.

In order to cope with the above problem, for example, when the device image or the function image is superimposed on another device image for a predetermined time or longer, the specifying unit 38 identifies a device associated with the other device image as a device to be linked. Similarly, for example, when the device image or the function image is superimposed on the other function image for a predetermined time or longer, the specifying unit 38 identifies a function associated with the other function image as a function to be linked.

In the example illustrated in FIG. 24, when the user moves the function image 86 onto the device image 70 along the locus 112 so that the function image 86 is superimposed on the device image 70 for a predetermined time or longer, the specifying unit 38 identifies the multifunction device (B) associated with the device image 70 as a device to be linked. In this case, information indicating a linkage function executable using the calculation software and the multifunction device (B) is displayed. In another example, in a case where the user designates the function image 86, then traces using a pointer from the function image 86 to the device image 70 on the screen 76 along the locus 112, and designates the device image 70 for a predetermined time or longer, the specifying unit 38 may identify the multifunction device (B) associated with the device image 70 as a device to be linked. When the function image 86 is designated for a predetermined time or longer, the specifying unit 38 may identify the calculation software associated with the function image 86 as a function to be linked. In this manner, the device associated with the device image 106 or the function associated with the function image 82, which is displayed along the locus 112, is not selected as a device or function to be linked. Thus, it is possible to prevent the user from selecting an unintended device or function as an object to be linked.

Figure 25:
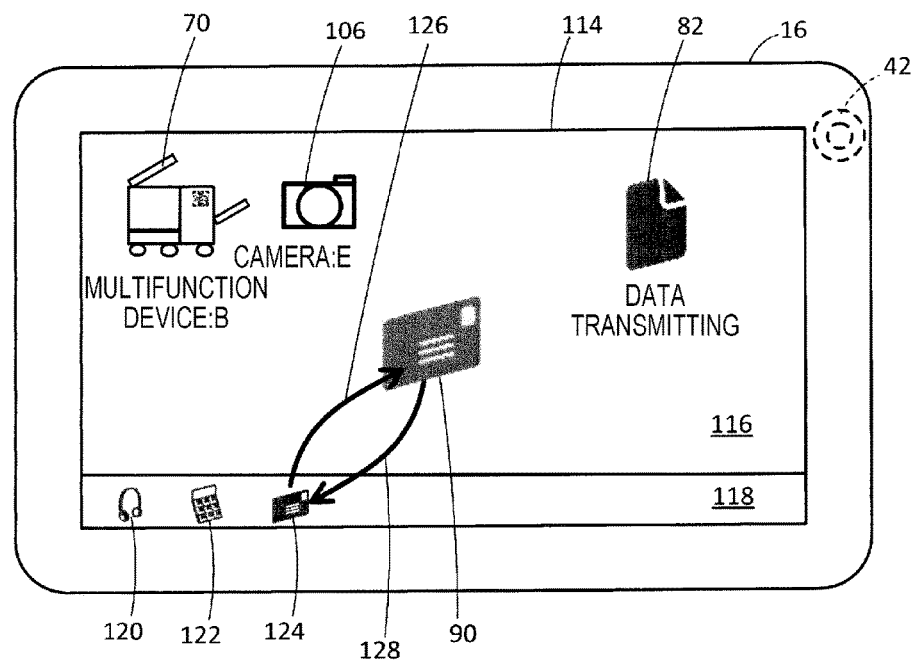
FIG. 25 is a diagram illustrating an example of a screen.

FIG. 25 illustrates still another operation example. A screen 114 is displayed on the UI unit 46 of the terminal device 16. The screen 114 is a desktop screen as a basic operation screen, and includes, for example, a main display area 116 and a sub display area 118.

The main display area 116 displays a device image, a function image, an image associated with a file, an image associated with a folder, and the like. Further, when software is executed (activated), an operation screen of the software (for example, a document edit screen, a spreadsheet screen, an image viewer, an image processing screen, a web browser, etc.) is displayed in the main display area 116. In addition, information indicating linkage functions is displayed in the main display area 116.

The sub display area 118 is a horizontally elongated area which is displayed in the lower area of the screen 114 and is an area called a task bar. The sub display area 118 displays, for example, a device image, a function image, other icons, and the like. The image displayed in the sub display area 118 may be an image having a reduced size of the original image, an image having the same size as that of the original image, or an image having an enlarged size of the original image. In the example illustrated in FIG. 25, reduced images are displayed in the sub display area 118. For example, an image 120 is a reduced image of the function image 78, an image 122 is a reduced image of the function image 86, and an image 124 is a reduced image of the function image 90. Of course, reduced images of the device images may be displayed in the sub display area 118. The sub display area 118 may display a device image, a function image, other icons, and the like, which are determined in advance, or may display a device image, a function image, and other icons, which are designated by the user. The sub display area 118 may be a horizontally elongated area which is displayed on the upper part of the screen 114, or may be a vertically elongated area which is displayed on either the right side or the left side of the screen 114.

By an operation by the user, the image displayed in the sub display area 118 may be moved to the main display area 116 or the image displayed in the main display area 116 is moved to the sub display area 118. In the example illustrated in FIG. 25, the image 124 is moved from the sub display area 118 to the main display area 116 as indicated by an arrow 126. At this time, the control unit 48 of the terminal device 16 enlarges the image 124 as the reduced image and displays the enlarged function image 90 in the main display area 116. The moved image 124 is not displayed in the sub display area 118. In addition, the function image 90 may be moved from the main display area 116 to the sub display area 118 as indicated by an arrow 128. At this time, the control unit 48 of the terminal device 16 reduces the function image 90 and displays the reduced image 124 in the sub display area 118. The moved function image 90 is not displayed in the main display area 116.

The main display area 116 corresponds to an example of a linkage area, and operations for displaying linkage functions may be performed on device images or function images displayed in the main display area 116. That is, similarly to the above-described exemplary embodiments, when the user operates a device image or a function image displayed in the main display area 116, a device or function to be linked is designated, and information indicating a linkage function executable using the designated device or function is displayed.

For example, when the linkage function is not used, the user may move the device image and the function image to the sub display area 118. When the linkage function is used, the user may move a device image or function image associated with a device or function necessary for executing the linkage function from the sub display area 118 to the main display area 116. In this manner, a device image or function image associated with a device or function that is not necessary for executing the linkage function is not displayed in the main display area 116. Thus, it is possible to facilitate the user operation for the linkage.

In the first to third exemplary embodiments described above, when the linkage function executable using the device or function designated by the user is not registered in the linkage function management table, the specifying unit 38 of the server 14 determines that the linkage function executable using the device or function designated by the user is not registered. In this case, the control unit 36 of the server 14 outputs a message indicating that the linkage function is unable to be executed by the designated device or function. This message is displayed on the UI unit 46 of the terminal device 16. Even in such a case, the linkage function may be usable depending on the operation status of the device, the environment in which the device is installed (peripheral environment), the change (update) in the function of the device, the execution status of the process by the software, or the like. For example, even in a case where a multifunction device and a dryer are selected as the devices to be connected, but initially, there is no linkage function executable by the multifunction device and the dryer, the dryer may remove or prevent any dew condensation which may occur in the environment where the multifunction device is installed. In this case, since it is possible to use the linkage function executable using the multifunction device and the dryer, information indicating the linkage function may be displayed on the UI unit 46 of the terminal device 16. For example, the control unit 36 of the server 14 may monitor the operation status of each device, the environment (peripheral environment) where each device is set, the update status of the functions of each device, the execution status of the process by the software, and the like, and determine whether the linkage function is usable or unusable based on the monitoring result. Descriptions will be made on a combination of the multifunction device and the dryer as an example. When the peripheral environment of the multifunction device satisfies a specific condition (for example, when dew condensation occurs in the peripheral environment of the multifunction device), the control unit 36 determines that the linkage function is usable and specifies (identifies) a linkage function using the dryer. The same applies to the operation status of the device, and the control unit 36 determines that, when an identified or designated device group corresponds to a specific operation status, it is possible to use the linkage function using the device group. Further, the same is true when a function of a device is updated and a linkage function is made usable by the updated function, when the software is made usable, or when the software is updated and the linkage function is made usable.

Hereinafter, the related process will be described.
(Related Process 1: Display Switching Process of Information on Linkage Function)

Hereinafter, a related process 1 will be described. In the first exemplary embodiment, display of information on linkage functions may be switched according to a selection order of plural devices. Hereinafter, the process will be described in detail with reference to FIGS. 26 to 28.

FIG. 26 illustrates another exemplary linkage function management table as the linkage function management information 34. In the linkage function management table, as an example, the information indicating a combination of the device IDs, the information indicating the names of the devices to be linked (for example, the types of the devices), the information indicating linkage functions (linkage function information), the information indicating a connection order, and the information indicating a priority order are associated with each other. The device ID and the device name corresponds to an example of the device identification information. The connection order corresponds to the designation order of the devices, for example, the order in which device images are connected or superimposed. For example, when the user sequentially designates plural devices, the designation order corresponds to the connection order. Further, when the user connects a first device image to a second device image, the designation order of the first device associated with the first device image is No. 1, and the designation order of the second device associated with the second device image is No. 2. Further, when the user superimposes the first device image on the second device image, the designation order of the first device associated with the first device image is No. 1, and the designation order of the second device associated with the second device image is No. 2. The priority order is an order of priority for displaying information on the linkage function. For example, the device of which the device ID is "A" is a PC (personal computer), and the device of which the device ID is "B" is a multifunction device. When the PC (A) and the multifunction device (B) are linked to each other, for example, a "scan transfer function" and a "print function" are implemented as linkage functions. The "scan transfer function" is a function of transferring image data generated by scanning by the multifunction device (B) to the PC (A). The "print function" is a function of transmitting data (for example, image data and document data) saved in the PC (A) to the multifunction device (B) and printing it with the multifunction device (B). For example, when a device is connected from the multifunction device (B) to the PC (A), that is, when the respective devices are designated by the user in the order of the multifunction device (B) and the PC (A), the priority order of the "scan transfer function" is "1st place," and the priority order of the "print function" is "2nd place." In this case, the information on the "scan transfer function" is displayed preferentially over the information on the "print function." Conversely, when a device is connected from the PC (A) to the multifunction device (B), that is, when the respective devices are designated by the user in the order of the PC (A) and the multifunction device (B), the priority order of the "print function" is "1st place," and the priority order of the "scan transfer function" is "2nd place." In this case, the information on the "print function" is displayed preferentially over the information on the "scan transfer function."

For example, when the respective devices are designated by the user in the order of the multifunction device (B) and the PC (A), the designation order is designated as the connection order. For example, when the user connects the device image associated with the multifunction device (B) to the device image associated with the PC (A) or superimpose the device image associated with the multifunction device (B) on the device image associated with the PC (A), the order of connection with each device is designated. Information indicating the connection order of the devices is transmitted from the terminal device 16 to the server 14. The specifying unit 38 of the server 14 specifies linkage functions associated with the combination of the PC (A) and the multifunction device (B) in the linkage function management table illustrated in FIG. 26. Therefore, the linkage function executed by linking the PC (A) and the multifunction device (B) is specified. Further, when the connection order of the devices is designated by the user, the specifying unit 38 specifies the priority order associated with the connection order in the linkage function management table. Descriptions will be made on a specific example with reference to FIG. 26. Since the PC (A) and the multifunction device (B) are designated as devices to be linked, the linkage functions executed by the devices are a "scan transfer function" and a "print function." Further, since the device is connected from the multifunction device (B) to the PC (A) (B→A), the priority order of the "scan transfer function" is "1st place" and the priority order of the "print function" is "2nd place."

Information on the linkage functions specified as described above and information indicating the priority order are transmitted from the server 14 to the terminal device 16. The control unit 48 of the terminal device 16 causes the UI unit 46 to display information on the linkage functions as information on the linkage function candidate according to the priority order.

Figure 27:
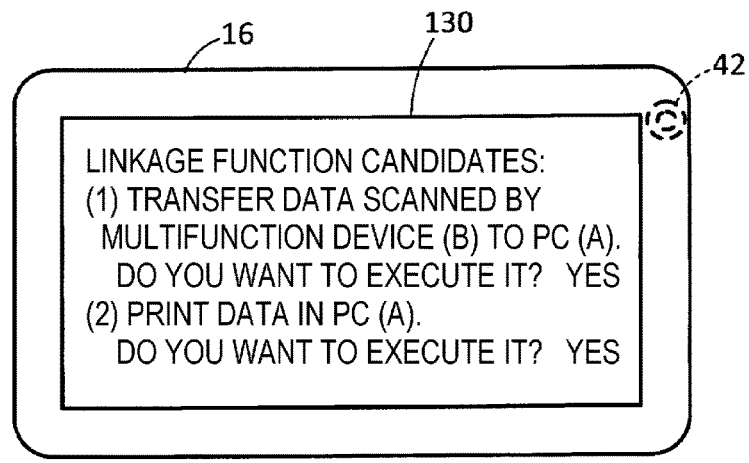
FIG. 27 is a diagram illustrating an example of a screen.

FIG. 27 illustrates a screen 130 displayed on the UI unit 46 of the terminal device 16. Information on candidate linkage functions is displayed on the screen 130. Since the priority order of the "scan transfer function" is "1st place" and the priority order of the "print function" is "2nd place," the information on the "scan transfer function" is displayed preferentially over (for example, in a higher place than) the information on the "print function." For example, a description of the "scan transfer function" indicating that "transfer data scanned by multifunction device (B) to PC (A)" is displayed as information on the "scan transfer function." In addition, a description of the "print function" indicating that "print data in PC (A)" is displayed as information on the "print function."

When a linkage function is designated by the user and an execution instruction is given thereto, the designated linkage function is executed. For example, when the "YES" button is pressed by the user, the linkage function associated with the "YES" button is executed. Further, a "return" button is displayed on the screen, and when the user presses the "return" button, the process of connecting the device is canceled.

The linkage function specification process and the priority order specification process may be performed by the terminal device 16.

Figure 28:
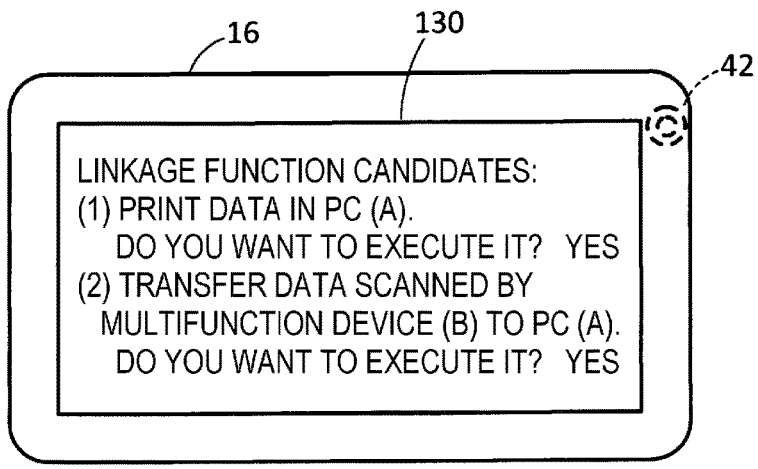
FIG. 28 is a diagram illustrating an example of a screen.

As another example, when the respective devices are designated by the user in the order of the PC (A) and the multifunction device (B), the designation order is designated as the connection order. For example, when the user connects the device image associated with the PC (A) to the device image associated with the multifunction device (B) or superimpose the device image associated with the PC (A) on the device image associated with the multifunction device (B), the order of connection with each device is designated. Information indicating the connection order of the devices is transmitted from the terminal device 16 to the server 14. Referring to the linkage function management table illustrated in FIG. 26, the priority order of the "print function" is "1st place," and the priority order of the "scan transfer function" is "2nd place." In this case, as illustrated in FIG. 28, the information on the "print function" is displayed preferentially over (for example, in a higher place than) the information on the "scan transfer function," on the screen 130.

As described above, the display order of the information on the linkage functions is changed according to the designation order of the devices. The connection order of the devices also serves as the order of the functions used by each device and the order of movement of the data moving among the devices to be linked, and the operation of designating the device also serves as an operation for designating the order of functions and the order of movement of data. Therefore, as the display order of the information on the linkage functions is changed according to the connection order, the information on the linkage functions predicted to be used by the user is preferentially displayed. That is, information on the linkage functions with a high possibility of being used by the user is preferentially displayed. For example, when respective devices are selected in the order of the multifunction device (B) and the PC (A), it is predicted that the user will use the linkage function of "using the function of the multifunction device (B) prior to the PC (A) and transferring the data from the multifunction device (B) to the PC (A)." In addition, when respective devices are selected in the order of the PC (A) and the multifunction device (B), it is predicted that the user will use the linkage function of "using the function of the PC (A) prior to the multifunction device (B) and transferring the data from the PC (A) to the multifunction device (B)." Therefore, as the display order of the information on the linkage functions is changed according to the order of selecting the devices, the information on the linkage functions with a high possibility to be used by the user is preferentially displayed.

The related process 1 may be applied to the second exemplary embodiment. In this case, in the linkage function management table, as an example, the information indicating a combination of the function IDs, the information indicating the names of the functions to be linked, the information indicating the linkage functions, the information indicating a connection order, and the information indicating a priority order are associated with each other. The connection order corresponds to the designation order of the functions, for example, the order in which function images are connected or superimposed. For example, when the user sequentially designates plural functions, the designation order corresponds to the connection order. Further, when the user connects a first function image to a second function image, the designation order of the first function associated with the first function image is No. 1, and the designation order of the second function associated with the second function image is No. 2. Further, when the user superimposes a first function image on a second function image, the designation order of the first function associated with the first function image is No. 1, and the designation order of the second function associated with the second function image is No. 2. As described above, by referring to the linkage function management table, linkage functions associated with a combination of designated plural functions are specified, and furthermore, the priority order associated with the connection order as the designation order is specified. In the UI unit 46 of the terminal device 16, information on the linkage functions is displayed according to the priority order.

The related process 1 may be applied to the third exemplary embodiment. In this case, in the linkage function management table, as an example, the information indicating a combination of the device ID and the function ID, the information indicating the names of the device and function to be linked, the information indicating the linkage functions, the information indicating a connection order, and the information indicating a priority order are associated with each other. The connection order corresponds to the designation order of the device and the function, for example, the order in which the device image and the function image are connected or superimposed. For example, when the user sequentially designates a device and a function, the designation order corresponds to the connection order. Further, when the user connects the device image to the function image, the designation order of the device associated with the device image is No. 1, and the designation order of the function associated with the function image is No. 2. Conversely, when the user connects the function image to the device image, the designation order of the function associated with the function image is No. 1, and the designation order of the device associated with the device image is No. 2. Further, when the user superimposes the device image on the function image, the designation order of the device associated with the device image is No. 1, and the designation order of the function associated with the function image is No. 2. Conversely, when the user superimposes the function image on the device image, the designation order of the function associated with the function image is No. 1, and the designation order of the device associated with the device image is No. 2. As described above, by referring to the linkage function management table, linkage functions associated with a combination of the designated device and function are specified, and furthermore, the priority order associated with the connection order as the designation order is specified. In the UI unit 46 of the terminal device 16, information on the linkage functions is displayed according to the priority order.

(Related Process 2: Linkage Process Using Portion of Device)

Hereinafter, a related process 2 will be described. Different functions may be assigned to respective positions in the device image associated with the device. When the position in the device image is designated by the user, information on the linkage function that uses the function associated with the position designated by the user is displayed. Hereinafter, the process will be described in detail.

FIG. 29 illustrates an exemplary device function management table. The data of the device function management table is stored in the server 14 as the device function management information 32. In the device function management table, as an example, the device ID, the information indicating the device name (for example, the type of the device), the information indicating the position in the device image, the information indicating the function associated with the position in the device image (function information), and the image ID are associated with each other. The position in the device image is a specific position (specific portion) in the device image associated with the device. For example, the position in the device image is a specific position in the device image schematically representing the device or a specific position in a device image captured by the camera. Different functions are associated with respective specific positions in the device image.

Figure 30:
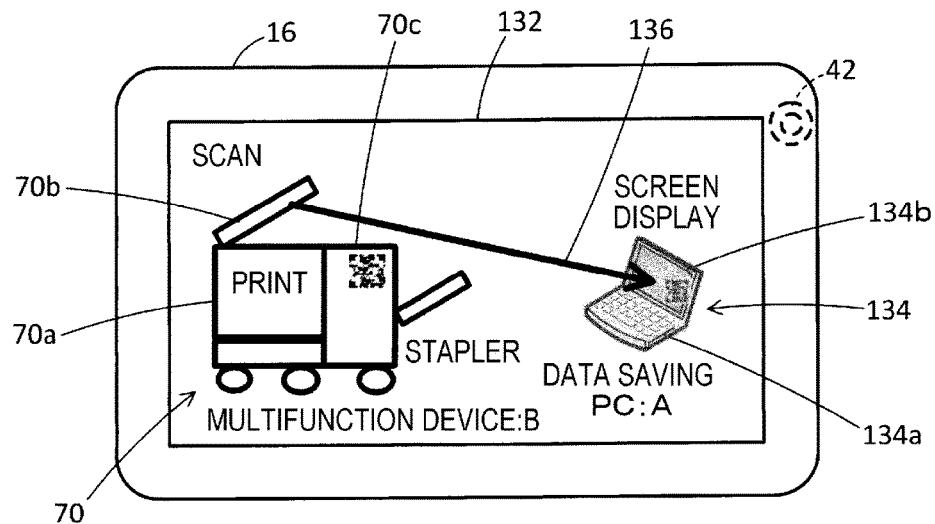
FIG. 30 is a diagram illustrating an example of a screen.

FIG. 30 illustrates an example of the screen displayed on the UI unit 46 of the terminal device 16. For example, the multifunction device (B) and the PC (A) are identified, and device images 70 and 134 are displayed on the screen 132. In addition, the portions included in the multifunction device (B) and PC (A) are also identified. The identification of the portions is also implemented using the identification technology (for example, AR technology) according to the first exemplary embodiment. For example, each portion of the device is captured, and each portion is identified by applying the markerless AR technique.

The device image 134 is an image associated with the PC (A). For example, a "print function" is assigned to a specific position (portion image 70a) associated with the main body portion of the multifunction device (B) in the device image 70. A "scan function" is assigned to a specific position (portion image 70b) associated with the document cover, the document glass or the automatic document feeder of the multifunction device (B) in the device image 70. A "stapling function" is assigned to a specific position (portion image 70c) associated with a post-processing device in the device image 70. The "stapling function" is a function of stapling the output paper. Further, a "data saving function" is assigned to a specific position (portion image 134a) associated with the main body portion of the PC (A) in the device image 134. A "screen display function" is assigned to a specific position (portion image 134b) associated with the display unit of the PC (A) in the device image 134. The "data saving function" is a function of saving data transmitted from another device in the PC (A). The "screen display function" is a function of displaying data transmitted from another device on the PC (A).

The control unit 48 of the terminal device 16 may display, in the screen 132, the name of the function (for example, printing, scanning, etc.) assigned to a specific position in the device image. As a result, the user is provided with information that makes it easy to understand what functions are associated with specific positions. Of course, the name of the function need not be displayed.

When the user designates a position with which a function is associated in a device image, the function associated with the designated position is designated as a function to be linked. The user connects the specific position (portion image) with which the function is associated in the device image, using a pointer. For example, as illustrated by an arrow 136, the user connects a portion image 70b and a portion image 134b using an operator. Therefore, the multifunction device (B) associated with the device image 70 including the portion image 70b and the PC (A) associated with the device image 134 including the portion image 134b are designated as devices to be linked, and the "scan function" associated with the portion image 70b and the "screen display function" corresponding to the portion image 134b are designated.

When the devices to be linked (for example, the PC (A) and the multifunction device (B)) are identified, the specifying unit 38 of the server 14 specifies linkage functions implemented by linking the PC (A) and the multifunction device (B) in the linkage function management table illustrated in FIG. 7. Further, the specifying unit 38 specifies the function associated with the specific position designated by the user in the device image by referring to the device function management table illustrated in FIG. 29. Then, among the group of linkage functions implemented by linking the PC (A) and the multifunction device (B), the specifying unit 38 raises the priority order of linkage functions using the function associated with the position designated by the user, and lowers the priority order of linkage functions not using the function.

Information on the linkage functions specified as described above and information indicating the priority order are transmitted from the server 14 to the terminal device 16. The control unit 48 of the terminal device 16 causes the UI unit 46 to display information on the linkage functions as information on the linkage function candidate according to the priority order.

Figure 31:
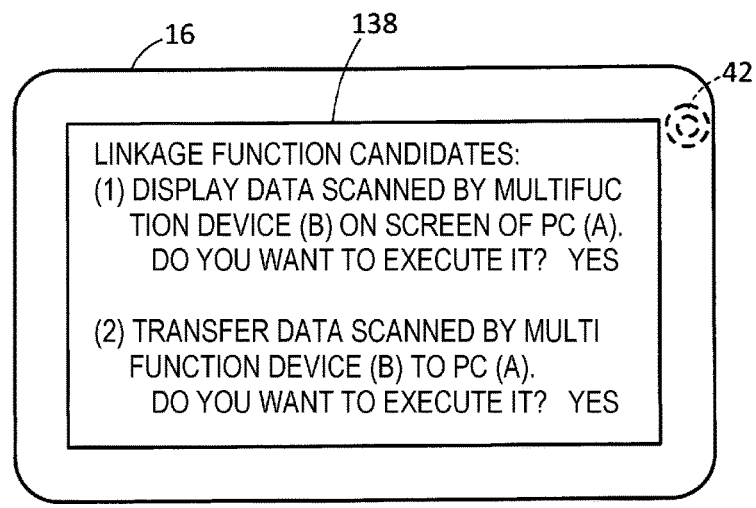
FIG. 31 is a diagram illustrating an example of a screen.

For example, as illustrated in FIG. 31, the control unit 48 of the terminal device 16 displays the screen 138 on the display unit of the UI unit 46 and displays information on the linkage function candidates in the screen 138. Since the "scan function" and the "screen display function" are designated by the user in that order, the information on the linkage function "scan transfer display function" executed by linking the "scan function" and the "screen display function" is displayed preferentially over (for example, in a higher place than) information on other linkage functions. For example, the information on the "scan transfer display function" is displayed preferentially over information on the linkage function "scan transfer saving function" executed by linking the "scan function" and the "data saving function." The scan transfer display function is a function of transferring data generated by scanning by the multifunction device (B) to the PC (A) and displaying the data on the screen of the PC (A). The scan transfer saving function is a function of transferring data generated by scanning by the multifunction device (B) to the PC (A) and saving the data in the PC (A). In the example illustrated in FIG. 31, an explanatory text is displayed for each linkage function as information on each linkage function.

According to the related process 2, when a device to be linked has plural functions, each function is individually designated and information on a linkage function using the designated function is preferentially displayed. Therefore, a linkage function that is expected to be used by the user is preferentially displayed.

The linkage function may be a function using a combination of portions of devices that are identical to or different from each other, may be a function using a combination of the entire device and a portion of the device, or may be a function using a combination of the entire devices.

Further, by combining the related processes 1 and 2, display of information on the linkage functions may be switched according to a designation order of the devices or the portions.

Further, when only one device or one portion is designated by the user, information indicating a solo function executable by the one device or one portion is displayed on the UI unit 46 of the terminal device 16.

(Related Process 3: Another Example of Linkage Process Using Portion of Device)

Hereinafter, another example of the linkage process using portion images will be described as a related process 3 with reference to FIGS. 32 and 33.

FIG. 32 illustrates an exemplary device function management table. The data of the device function management table is stored in the server 14 as the device function management information 32. In the device function management table, as an example, a device ID, information indicating the device name (for example, the type of the device), information indicating a name of a portion of the device (for example, the type of the portion), a portion ID as portion identification information for identifying the portion, information indicating a function assigned to the portion (a function that the portion has), and a portion image ID for identifying the portion image associated with the portion are associated with each other. The portion image is an image representing the external appearance of the portion of the device obtained by capturing by the camera. Of course, a portion image that schematically representing a portion of the device may be associated with the portion. For example, different functions are assigned to respective portions of the device.

To describe with a specific example, a screen display function is assigned to the display unit of the PC (A), and information indicating the screen display function are associated with the portion image ID of the portion image associated with the display unit. The screen display function is a function of displaying the information on the PC (A). A data saving function is assigned to the main body portion of the PC (A), and information indicating the data saving function is associated with the portion image ID of the portion image associated with the main body portion. The data saving function is a function of saving data in the PC (A).

Further, a print function is assigned to the main body portion of the multifunction device (B), and information indicating the print function is associated with the portion image ID of the portion image associated with the main body portion. A scan function is assigned to the reading unit of the multifunction device (B) (for example, a portion associated with the document cover, the document glass, or the automatic document feeder of the multifunction device (B)), and information indicating the scan function is associated with the portion image ID of the portion image associated with the reading unit. A stapling function is assigned to the post-processing device of the multifunction device (B), and information indicating the stapling function is associated with the portion image ID of the portion image associated with the post-processing device. The stapling function is a function of binding the output paper with a staple.

The function assigned to a portion of the device is specified (identified), for example, using the markerless AR technique. For example, when a portion of the device is captured by a camera (for example, the camera 42 of the terminal device 16), external appearance image data representing the portion is transmitted from the terminal device 16 to the server 14. The specifying unit 38 of the server 14 specifies (identifies) the function associated with the external appearance image data in the device function management table. As a result, the function assigned to the captured portion is specified (identified). For example, when the main body portion of the multifunction device (B) is captured by the camera 42, external appearance image data representing the main body portion of the multifunction device (B) is transmitted from the terminal device 16 to the server 14. The specifying unit 38 of the server 14 specifies (identifies) the print function associated with the external appearance image data in the device function management table. As a result, it is specified that the function assigned to the main body portion of the multifunction device (B) is the print function.

Of course, the function assigned to a portion of the device may be specified (identified) using the marker AR technique. For example, a marker such as a two-dimensional barcode in which portion identification information (for example, a portion ID) for identifying a portion is encoded is provided in each portion of the device. When the marker provided in the portion is captured by the camera and the marker AR technique is applied, portion identification information (for example, a portion ID) of the portion is acquired. Application of the marker AR technique may be performed by the terminal device 16 or may be performed by the server 14. When the portion identification information is thus acquired, the specifying unit 38 of the server 14 specifies (identifies) the function associated with the portion identification information (for example, the portion ID) in the device function management table.

FIG. 33 illustrates an exemplary linkage function management table. The data of the linkage function management table is stored in the server 14 as the linkage function management information 34. The linkage function management table is information indicating a linkage function that uses functions that plural portions have. In the linkage function management table, as an example, information indicating a combination of portions of the device, information indicating a combination of portion IDs, and information indicating a linkage function using functions that plural portions included in the combination have are associated with each other. Of course, in the linkage function management table, information indicating a combination of a portion of a device and an entire device, and information indicating a linkage function using a function that the portion of the device has and a function that the entire device has may be associated with each other.

To describe with a specific example, a print function as a linkage function is assigned to a combination of the display unit of the PC (A) and the main body portion of the multifunction device (B), and information indicating the print function as a linkage function is associated with information indicating a combination of the portion ID of the display unit of the PC (A) and the portion ID of the main body portion of the multifunction device (B). The print function as a linkage function is, for example, a function of transmitting data saved in the PC (A) to the multifunction device (B) and printing the data by the multifunction device (B).

Further, a print function as a linkage function is assigned to a combination of the main body portion of the multifunction device (B) and the main body portion of the projector (C), and information indicating the print function as a linkage function is associated with information indicating a combination of the portion ID of the main body portion of the multifunction device (B) and the portion ID of the main body portion of the projector (C). The print function as a linkage function is, for example, a function of transmitting data projected by the projector (C) to the multifunction device (B) and printing the data by the multifunction device (B).

Further, a scan projection function as a linkage function is assigned to a combination of the reading unit of the multifunction device (B) and the main body portion of the projector (C), and information indicating the scan projection function as a linkage function is associated with information indicating a combination of the portion ID of the reading unit of the multifunction device (B) and the portion ID of the main body portion of the projector (C). The scan projection function as a linkage function is, for example, a function of transmitting data generated by scanning by the multifunction device (B) to the projector (C) and projecting the data by the projector (C).

The linkage function may be a function that uses functions that plural portions included in the same device have or a function that uses functions that portions of plural different devices have. Further, the linkage function may be a function that uses functions that three or more portions have.

For example, when plural portions of the device (for example, plural portions of plural different devices or plural portions of the same device) are specified (identified) using the marker AR technique or the markerless AR technique, the specifying unit 38 of the server 14 specifies (identifies) the linkage function associated with a combination of the identified plural portions in the linkage function management table. Therefore, the linkage function using the functions that the identified (for example, captured) plural portions have is specified (identified). For example, when the main body portion of the multifunction device (B) and the main body portion of the projector (C) are captured by the camera 42 of the terminal device 16 to identify the main body portion of the multifunction device (B) and the main body portion of the projector (C), the specifying unit 38 of the server 14 specifies the print function and the like as a linkage function associated with the combination of the main body portion of the multifunction device (B) and the main body portion of the projector (C) in the linkage function management table.

Similarly to the related process 2, when plural portions are designated, linkage functions executable using the plural portions are specified by referring to the linkage function management table, and information indicating the linkage functions is displayed in the terminal device 16.

Further, by combining the related processes 1 and 3, display of information on the linkage functions may be switched according to a designation order of the device images or the portion images.

The portion image may be an image that is capable of being separated and moved away from the device image. For example, as illustrated in FIG. 34, when the user moves the portion image 70b in a direction indicated by an arrow 142 and superimposes the portion image 70b on the portion image 134b, linkage functions executable using the function associated with the portion image 70b and the function associated with the portion image 134b are specified and information indicating the linkage functions is displayed. Of course, when a portion image is superimposed on the entire device image, information indicating linkage functions executable using the function associated with the portion image and the device associated with the device image may be displayed.

Figure 35:
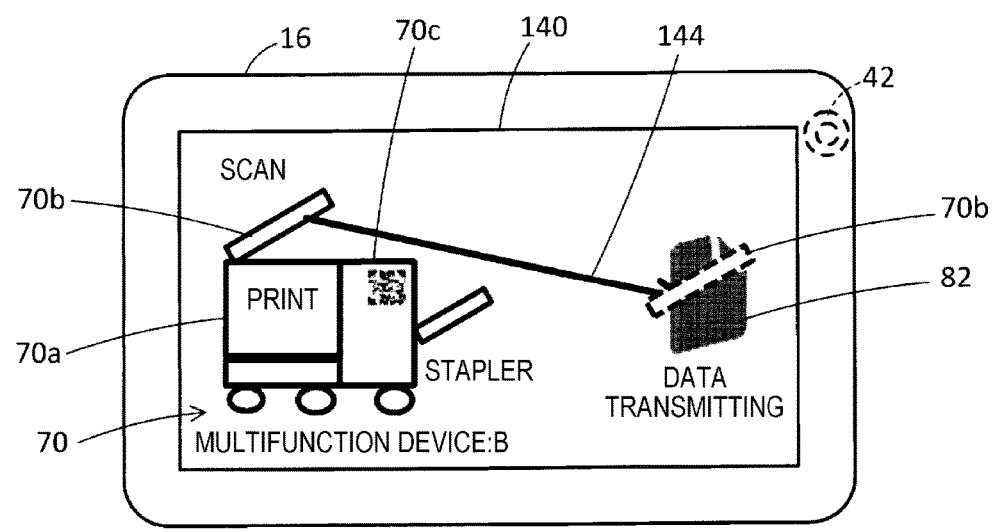
FIG. 35 is a diagram illustrating an example of a screen.

The related processes 2 and 3 may be applied to the third exemplary embodiment. For example, as illustrated in FIG. 35, a device image 70 associated with the multifunction device (B) and a function image 82 associated with the data transmission software (α) are displayed on a screen 140. In this case, when the user connects a portion image 70b and the function image 82, linkage functions executable using the function associated with the portion image 70b and the function associated with the function image 82 are specified and information indicating the linkage functions is displayed. Further, when the user moves the portion image 70b in a direction indicated by an arrow 144 and superimposes the portion image 70b on the function image 82, information indicating linkage functions executable using the function associated with the portion image 70b and the function associated with the function image 82 may be displayed.

Further, the related processes 1, 2, and 3 may be applied to the third exemplary embodiment. In this case, display of information on the linkage functions is switched according to a designation order of the device images, the portion images, and the function images. For example, the display of the information on the linkage functions may be switched according to the order in which respective images are connected or superimposed.

Further, the function image may also contain plural portion images. In this case, when different functions are assigned to respective portions in the entire function image, and a portion in the entire function image is designated, a function assigned to the designated portion may be designated. Even in this case, when a portion image in the function image and a portion image in the device image are designated, linkage functions executable using the respective functions associated with the respective portion images are specified, and information on the linkage functions is displayed.

The above-described first to third exemplary embodiments may be combined. For example, the control unit 48 of the terminal device 16 may switch among a first control mode, a second control mode, and a third control mode. The first control mode is a control mode corresponding to the first exemplary embodiment, and is a mode of controlling, when plural device images are designated, display of linkage functions executable using plural devices associated with the plural device images. The second control mode is a control mode corresponding to the second exemplary embodiment, and is a mode of controlling, when plural function images are designated, display of linkage functions executable using plural functions associated with the plural function images. The third control mode is a control mode corresponding to the third exemplary embodiment, and is a mode of controlling, when a device image and a function image are designated, display of linkage functions executable using a device associated with the device image and a function associated with the function images.

For example, as illustrated in FIG. 11, when device images are displayed on the screen of the UI unit 46 of the terminal device 16 but no function image is displayed thereon, the control unit 48 executes the first control mode. Further, as illustrated in FIG. 15, when function images are displayed on the screen but no device image is displayed thereon, the control unit 48 executes the second control mode. Further, as illustrated in FIG. 17, when a device image and a function image are displayed on the screen, the control unit 48 executes the third control mode.

For example, when device images are displayed in the main display area 116 illustrated in FIG. 25 but no function image is displayed therein, the control unit 48 executes the first control mode. When function images are displayed in the main display area 116 but no device image is displayed therein, the control unit 48 executes the second control mode. When a device image and a function image are displayed in the main display area 116, the control unit 48 executes the third control mode. For example, when the user exits and enters a device image or a function image between the main display area 116 and the sub display area 118, the images displayed in the main display area 116 are changed, and the control mode is changed accordingly.

(Other Exemplary Embodiments)

When a device image and a function image are displayed in a specific display area on the screen, information indicating linkage functions executable using the device associated with the device image and the function associated with the function image may be displayed in the terminal device 16. For example, when the user moves a device image associated with a device to be linked and a function image associated with a function to the above-described specific display area on the screen and gives an instruction to display linkage functions, information indicating the linkage functions executable using the device and the function is displayed.

The linkage function may be changed depending on the relationship between the display position of the device image and the display position of the function image on the screen. For example, when the relationship between the display position of the device image and the display position of the function image corresponds to a first positional relationship (for example, when the device image and the function image are arranged horizontally side by side), information indicating a linkage function according to the first positional relationship is displayed on the terminal device 16. For example, when the positional relationship corresponds to a second positional relationship (for example, when the device image and the function image are arranged vertically side by side), information indicating a linkage function according to the second positional relationship (a function different from the linkage function according to the first positional relationship) is displayed on the terminal device 16. For example, when the user moves a device image and a function image on the screen and gives an instruction to display linkage functions, information indicating linkage functions according to the positional relationship between the device image and the function image at that time is displayed. By performing such a control, it is possible to change the linkage functions by a simple operation (for example, an operation of rearranging images).

Further, when the relationship between the display position of the device image and the display position of the function image corresponds to the first positional relationship, information indicating linkage functions executable using the device associated with the device image and the function associated with the function image may be displayed. When the relationship corresponds to the second positional relationship, information indicating a solo function that the device has and information indicating the function (the solo function) may be displayed. In this manner, it is possible to switch between the display of the solo function and the display of the linkage function by a simple operation.

Further, the control unit 48 of the terminal device 16 may cause the UI unit 46 to display a list of linkage functions and cause the UI unit 46 to display information indicating the devices and functions capable of executing a linkage function selected by the user from the list. Such devices and functions are specified by referring to the linkage function management table. The specification is performed, for example, by the specifying unit 38, and the information specified by the specifying process is transmitted from the server 14 to the terminal device 16 and displayed. Of course, the specifying process may be performed by the terminal device 16. For example, When the linkage function selected by the user is a function executable using a first device and a second function (for example, software), information indicating the first device (for example, an image or a name associated with the first device) and information indicating the second function (for example, an image or a name associated with the second function) are displayed on the UI unit 46 of the terminal device 16. Therefore, the user is provided with a device and a function necessary to execute the linkage function selected by the user. When the linkage function selected by the user is executable by plural devices, information indicating the plural devices is displayed on the UI unit 46. When the linkage function is executable by plural functions, information indicating the plural functions is displayed on the UI unit 46. A list of the linkage functions displayed on the UI unit 46 may be a list of linkage functions which are registered in advance or may be updated at a predetermined timing or any timing. Further, when the user cannot use the software necessary to execute the linkage function selected by the user (for example, when the software is not installed in the terminal device 16 or is not permitted to be used), information indicating an operation necessary to use the software, or the like may be displayed on the UI unit 46. For example, information prompting the user to install the software or information indicating the operation necessary to obtain use authority is displayed.

Each of the image forming device 10, the server 14 and the terminal device 16 is implemented by, for example, cooperation of hardware and software. Specifically, each of the image forming device 10, the server 14, and the terminal device 16 includes one or plural processors such as CPUs (not illustrated). As the one or plural processors read and execute a program stored in the storage device (not illustrated), the functions of each portion of the image forming device 10, the server 14, and the terminal device 16 are implemented. The program is stored in a storage device via a recording medium such as a CD or a DVD, or via a communication path such as a network. As another example, each unit of the image forming device 10, the server 14, and the terminal device 16 may be implemented by hardware resources such as a processor, an electronic circuit, an application specific integrated circuit (ASIC), or the like. A device such as a memory may be used in the implementation. As still another example, each unit of the image forming device 10, the server 14, and the terminal device 16 may be implemented by a digital signal processor (DSP), a Field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a controller configured to
   determine whether a drag-and-drop operation is performed on at least one of a device image associated with a device and a function image associated with a function;
   control display of a linkage function executable using the device and the function in response to determining that the drag-and-drop operation is performed on the at least one of the device image associated with the device and the function image associated with the function; and
   issue an execution instruction to the device associated with the device image to execute the linkage function,
   wherein the device associated with the device image comprises a multifunction device configured to perform a plurality of device functions, each of the plurality of device functions is associated with a portion of the multifunction device, and the controller identifies a device function among the plurality of device functions of the multifunction device to be linked in the linkage function according to the drag-and-drop operation.

2. The information processing device according to claim 1, wherein the device image is a captured image generated by capturing the device.

3. The information processing device according to claim 1, wherein the device image is an image representing an external appearance of the device.

4. The information processing device according to claim 1, wherein when the device image or the function image is superimposed on another device image for a predetermined time or longer, the controller controls display of a linkage function executable using another device associated with the other device image.

5. The information processing device according to claim 1, wherein when the device image or the function image is superimposed on another function image by the user for a predetermined time or longer, the controller controls display of a linkage function executable using another function associated with the other function image.

6. The information processing device according to claim 1, wherein when a plurality of the device images and a plurality of the function images are selected by the user, the controller controls the display of the linkage function executable using a plurality of devices associated with the plurality of selected device images and a plurality of functions associated with the plurality of selected function images.

7. The information processing device according to claim 1, wherein when an image associated with data is superimposed on the device image, the controller registers the data as an object to be processed by the device associated with the device image.

8. The information processing device according to claim 1, wherein when an image associated with data is superimposed on the function image, the controller registers the data as an object to be processed by the function associated with the function image.

9. The information processing device according to claim 1, wherein when the device image and the function image are displayed in a predetermined area on a screen and are moved from the predetermined area to a linkage area on the screen, an operation for displaying the linkage function becomes enabled.

10. The information processing device according to claim 9, wherein
when being moved from the predetermined area to the linkage area, the device image and the function image are enlarged and displayed, and
when being moved from the linkage area to the predetermined area, the device image and the function image are reduced and displayed.

11. The information processing device according to claim 1, wherein the controller changes the display of the linkage function, depending on an order of operations for the device image and the function image.

12. The information processing device according to claim 1, wherein the controller controls the display of the linkage function when the device image and the function image are superimposed on each other.

13. The information processing device according to claim 1, wherein the controller controls the display of the linkage function when the device image and the function image are connected to each other.

14. The information processing device according to claim 1, wherein the controller controls display of an image obtained by combining the device image and the function image.

15. The information processing device according to claim 1, wherein
the device image includes a portion image associated with a portion of the device, and
the controller controls display of a linkage function executable using the portion associated with the portion image when the portion image is operated by the user.

16. The information processing device according to claim 1, wherein
the controller performs a control by switching among a first control mode of controlling display of a linkage function executable using a plurality of devices upon receiving a user's operation for a plurality of device images, a second control mode of controlling display of a linkage function executable using a plurality of functions upon receiving a user's operation for a plurality of function images, and a third control mode of controlling display of a linkage function executable using a device and a function upon receiving a user's operation for a device image and a function image.

17. The information processing device according to claim 16, wherein the controller performs the control according to the first control mode when the device image is displayed on a screen and the function image is not displayed on the screen.

18. The information processing device according to claim 16, wherein the controller performs the control according to the second control mode when the function image is displayed on a screen and the device image is not displayed on the screen.

19. The information processing device according to claim 16, wherein the controller performs the control according to the third control mode when the device image and the function image are displayed on a screen.

20. A non-transitory computer readable medium storing a program causing a computer to execute information processing, the information processing comprising:
determining whether a drag-and-drop operation is performed on at least one of a device image associated with a device and a function image associated with a function;
controlling display of a linkage function executable using the device and the function in response to determining that the drag-and-drop operation is performed on the at least one of the device image associated with the device and the function image associated with the function; and
issuing an execution instruction to the device associated with the device image to execute the linkage function,
wherein the device associated with the device image comprises a multifunction device configured to perform a plurality of device functions, each of the plurality of device functions is associated with a portion of the multifunction device, and a device function among the plurality of device functions of the multifunction device to be linked in the linkage function is identified according to the drag-and-drop operation.

* * * * *